United States Patent
Zhang et al.

(10) Patent No.: US 11,251,914 B2
(45) Date of Patent: Feb. 15, 2022

(54) FLEXIBLE SINGLE CARRIER WAVEFORMS

(71) Applicant: QUALCOMM Incorporated, San Diego, CA (US)

(72) Inventors: Xiaoxia Zhang, San Diego, CA (US); Srinivas Yerramalli, San Diego, CA (US); Zhifei Fan, San Diego, CA (US); Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 16/860,984

(22) Filed: Apr. 28, 2020

(65) Prior Publication Data

US 2020/0358569 A1 Nov. 12, 2020

Related U.S. Application Data

(60) Provisional application No. 62/846,436, filed on May 10, 2019.

(51) Int. Cl.
*H04L 5/00* (2006.01)

(52) U.S. Cl.
CPC .......... *H04L 5/0044* (2013.01); *H04L 5/0007* (2013.01)

(58) Field of Classification Search
CPC ........................ H04W 72/0413; H04W 72/04
See application file for complete search history.

(56) References Cited

U.S. PATENT DOCUMENTS

| | | | |
|---|---|---|---|
| 2011/0261774 A1* | 10/2011 | Lunttila | H04L 1/00 370/329 |
| 2014/0185560 A1 | 7/2014 | Kim et al. | |
| 2015/0181589 A1* | 6/2015 | Luo | H04W 74/0833 370/329 |

FOREIGN PATENT DOCUMENTS

WO  WO-2017112694 A1  6/2017

OTHER PUBLICATIONS

Partial International Search Report—PCT/US2020/030504—ISA/EPO—Aug. 20, 2020.

(Continued)

*Primary Examiner* — Kevin Kim
(74) *Attorney, Agent, or Firm* — Holland & Hart LLP/Qualcomm

(57) ABSTRACT

Methods, systems, and devices for wireless communications are described to enable a user equipment (UE) or a base station to transmit and receive single carrier (SC) waveforms (e.g., corresponding to uplink or downlink transmissions) using an SC transmission configuration. In some cases, a UE and a base station may employ an SC configuration to identify resource elements (REs) for uplink or downlink SC signals. Additionally or alternatively, the UE and the base station may employ an SC configuration with a different cyclic prefix (CP) length in order to change a base amount of REs that may be allocated for an SC transmission, where the different CP length may be either static or dynamic. The base station may transmit an indication of an SC configuration to the UE, and the UE and the base station may process corresponding SC downlink or uplink communications according to the indicated SC configuration.

28 Claims, 19 Drawing Sheets

(56) References Cited

OTHER PUBLICATIONS

Renfors M., "Frequency-Domain Equalization and Single-Carrier Transmission in OFDM Framework", Sep. 11, 2013 (Sep. 11, 2013), XP055722185, 30 pages, Retrieved from the Internet: URL: http://www.cs.tut.fi/kurssit/TLT-5906/L1b_v1.pdf. [retrieved on Aug. 12, 2020] p. 23, paragraph 2.
International Search Report and Written Opinion—PCT/US2020/030504—ISA/EPO—Nov. 16, 2020.

* cited by examiner

FLEXIBLE SINGLE CARRIER WAVEFORMS

CROSS REFERENCE

The present Application for Patent claims the benefit of U.S. Provisional Patent Application No. 62/846,436 by ZHANG et al., entitled "FLEXIBLE SINGLE CARRIER WAVEFORM," filed May 10, 2019, assigned to the assignee hereof, and expressly incorporated by reference herein.

BACKGROUND

The following relates generally to wireless communications, and more specifically to flexible single carrier (SC) waveforms.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support flexible single carrier (SC) waveforms. Generally, the described techniques provide for enabling a user equipment (UE) or a base station to transmit and receive SC waveforms (e.g., corresponding to uplink or downlink transmissions) using an SC transmission configuration. A transmitting UE or base station (e.g., transmitting wireless device) may transmit uplink or downlink communications according to an identified SC transmission configuration and a receiving UE or base station (e.g., receiving wireless device) may receive the uplink or downlink communications according to the identified SC transmission configuration. In some cases, a UE and a base station may employ an SC configuration to identify resource elements (REs) (e.g., within a resource block (RB) set) to allocate for uplink or downlink SC signals (e.g., because not all REs within an allocation of RBs may be used for a transmission). Additionally or alternatively, the UE and the base station may employ an SC configuration with a different cyclic prefix (CP) length to adjust the number of REs allocated for an SC transmission, where the different CP length may be static or dynamic. In one example, the base station may transmit an indication of an SC configuration to the UE via a configuration indication in a control message (e.g., via a radio resource control (RRC) message, downlink control information (DCI), etc.). The UE may receive and decode the control message, and may identify the SC transmission configuration. The UE and the base station may implement the SC transmission configuration to receive or transmit SC downlink or uplink communications.

A method of wireless communications at a transmitting device is described. The method may include identifying a transmission configuration for an SC waveform, the transmission configuration indicating a set of RBs allocated for communications with a receiving device, allocating a set of REs of the set of RBs for the SC waveform based on the transmission configuration, where a number of the set of REs is less than a total number of REs of the set of RBs, and transmitting the SC waveform to the receiving device via the set of REs.

An apparatus for wireless communications at a transmitting device is described. The apparatus may include a processor, memory in electronic communication with the processor, and instructions stored in the memory. The instructions may be executable by the processor to cause the apparatus to identify a transmission configuration for an SC waveform, the transmission configuration indicating a set of RBs allocated for communications with a receiving device, allocate a set of REs of the set of RBs for the SC waveform based on the transmission configuration, where a number of the set of REs is less than a total number of REs of the set of RBs, and transmit the SC waveform to the receiving device via the set of REs.

Another apparatus for wireless communications at a transmitting device is described. The apparatus may include means for identifying a transmission configuration for an SC waveform, the transmission configuration indicating a set of RBs allocated for communications with a receiving device, allocating a set of REs of the set of RBs for the SC waveform based on the transmission configuration, where a number of the set of REs is less than a total number of REs of the set of RBs, and transmitting the SC waveform to the receiving device via the set of REs.

A non-transitory computer-readable medium storing code for wireless communications at a transmitting device is described. The code may include instructions executable by a processor to identify a transmission configuration for an SC waveform, the transmission configuration indicating a set of RBs allocated for communications with a receiving device, allocate a set of REs of the set of RBs for the SC waveform based on the transmission configuration, where a number of the set of REs is less than a total number of REs of the set of RBs, and transmit the SC waveform to the receiving device via the set of REs.

Some examples of the method, apparatuses, and non-transitory computer-readable medium described herein may further include operations, features, means, or instructions for identifying a mapping configuration for mapping data associated with the SC waveform to the set of REs based on the transmission configuration, and mapping the data associated with the SC waveform to the set of REs according to the mapping configuration.

In some examples of the method, apparatuses, and non-transitory computer-readable medium described herein, mapping the data may include operations, features, means, or instructions for mapping data beginning at a first RE, a middle RE, or a last RE of the set of REs based on the mapping configuration and respective locations of each RE of the set of REs.

In some examples of the method, apparatuses, and non-transitory computer-readable medium described herein, the data may be mapped such that at least one RE of the set of REs may be unoccupied.

Some examples of the method, apparatuses, and non-transitory computer-readable medium described herein may further include operations, features, means, or instructions for receiving an indication of the mapping configuration in a message from the receiving device, the message including the transmission configuration.

Some examples of the method, apparatuses, and non-transitory computer-readable medium described herein may further include operations, features, means, or instructions for transmitting an indication of the transmission configuration to the receiving device via RRC signaling or DCI.

Some examples of the method, apparatuses, and non-transitory computer-readable medium described herein may further include operations, features, means, or instructions for receiving a message from the receiving device, the message indicating the transmission configuration for the SC waveform based on an RE identifier (REID) included in the message.

In some examples of the method, apparatuses, and non-transitory computer-readable medium described herein, the REID may be based on a cell identifier (ID) of a cell for communications between the transmitting device and the receiving device.

Some examples of the method, apparatuses, and non-transitory computer-readable medium described herein may further include operations, features, means, or instructions for determining a demodulation reference signal (DMRS) pattern, a DMRS length, or a transport block size (TBS) associated with the SC waveform based on the set of REs or the number of the set of REs.

Some examples of the method, apparatuses, and non-transitory computer-readable medium described herein may further include operations, features, means, or instructions for determining a CP configuration for the SC waveform based on the transmission configuration, where the CP configuration indicates a first CP ratio for an initial symbol of the SC waveform and a second CP ratio different from the first CP ratio for one or more symbols after the initial symbol of the SC waveform.

Some examples of the method, apparatuses, and non-transitory computer-readable medium described herein may further include operations, features, means, or instructions for determining the first CP ratio and the second CP ratio based on a subcarrier spacing associated with the SC waveform, generating a first CP for the initial symbol based on the first CP ratio, and generating at least one additional CP for the one or more symbols after the initial symbol based on the second CP ratio, where the second CP ratio may be less than the first CP ratio.

Some examples of the method, apparatuses, and non-transitory computer-readable medium described herein may further include operations, features, means, or instructions for transmitting the SC waveform including the first CP and the at least one additional CP to the receiving device.

In some examples of the method, apparatuses, and non-transitory computer-readable medium described herein, a number of samples for the first CP and a number of samples for the at least one additional CP may be based on the subcarrier spacing.

Some examples of the method, apparatuses, and non-transitory computer-readable medium described herein may further include operations, features, means, or instructions for determining the first CP ratio and the second CP ratio based on a bandwidth part (BWP) associated with the SC waveform, generating a first CP for the initial symbol based on the first CP ratio, and generating at least one additional CP for the one or more symbols after the initial symbol based on the second CP ratio, where the second CP ratio may be less than the first CP ratio.

In some examples of the method, apparatuses, and non-transitory computer-readable medium described herein, a number of samples for the first CP and a number of samples for the at least one additional CP may be based on a number of the set of RBs of the BWP.

Some examples of the method, apparatuses, and non-transitory computer-readable medium described herein may further include operations, features, means, or instructions for transmitting the SC waveform including the first CP and the at least one additional CP to the receiving device.

A method of wireless communications at a receiving device is described. The method may include identifying a transmission configuration for an SC waveform, the transmission configuration indicating a set of RBs allocated for communications with a transmitting device, determining a set of REs of the set of RBs for the SC waveform based on the transmission configuration, where a number of the set of REs is less than a total number of REs of the set of RBs, and receiving the SC waveform from the transmitting device via the set of REs.

An apparatus for wireless communications at a receiving device is described. The apparatus may include a processor, memory in electronic communication with the processor, and instructions stored in the memory. The instructions may be executable by the processor to cause the apparatus to identify a transmission configuration for an SC waveform, the transmission configuration indicating a set of RBs allocated for communications with a transmitting device, determine a set of REs of the set of RBs for the SC waveform based on the transmission configuration, where a number of the set of REs is less than a total number of REs of the set of RBs, and receive the SC waveform from the transmitting device via the set of REs.

Another apparatus for wireless communications at a receiving device is described. The apparatus may include means for identifying a transmission configuration for an SC waveform, the transmission configuration indicating a set of RBs allocated for communications with a transmitting device, determining a set of REs of the set of RBs for the SC waveform based on the transmission configuration, where a number of the set of REs is less than a total number of REs of the set of RBs, and receiving the SC waveform from the transmitting device via the set of REs.

A non-transitory computer-readable medium storing code for wireless communications at a receiving device is described. The code may include instructions executable by a processor to identify a transmission configuration for an SC waveform, the transmission configuration indicating a set of RBs allocated for communications with a transmitting device, determine a set of REs of the set of RBs for the SC waveform based on the transmission configuration, where a number of the set of REs is less than a total number of REs of the set of RBs, and receive the SC waveform from the transmitting device via the set of REs.

Some examples of the method, apparatuses, and non-transitory computer-readable medium described herein may further include operations, features, means, or instructions for identifying a mapping configuration for data of the SC waveform mapped to the set of REs based on the transmission configuration, and demapping the data of the SC waveform.

Some examples of the method, apparatuses, and non-transitory computer-readable medium described herein may further include operations, features, means, or instructions for demapping the data beginning at a first RE, a middle RE, or a last RE of the set of REs based on the mapping configuration and respective locations of each RE of the set of REs.

In some examples of the method, apparatuses, and non-transitory computer-readable medium described herein, the data may be mapped such that at least one RE of the set of REs may be unoccupied.

Some examples of the method, apparatuses, and non-transitory computer-readable medium described herein may further include operations, features, means, or instructions for receiving an indication of the mapping configuration in a message from the transmitting device, the message including the transmission configuration.

Some examples of the method, apparatuses, and non-transitory computer-readable medium described herein may further include operations, features, means, or instructions for receiving an indication of the transmission configuration from the transmitting device via RRC signaling or DCI.

Some examples of the method, apparatuses, and non-transitory computer-readable medium described herein may further include operations, features, means, or instructions for transmitting a message to the transmitting device, the message indicating the transmission configuration for the SC waveform based on a REID included in the message.

In some examples of the method, apparatuses, and non-transitory computer-readable medium described herein, the REID may be based on a cell ID of a cell for communications between the transmitting device and the receiving device.

Some examples of the method, apparatuses, and non-transitory computer-readable medium described herein may further include operations, features, means, or instructions for determining a DMRS pattern, a DMRS length, or a TBS associated with the SC waveform based on the set of REs or the number of the set of REs.

Some examples of the method, apparatuses, and non-transitory computer-readable medium described herein may further include operations, features, means, or instructions for determining a CP configuration for the SC waveform based on the transmission configuration, where the CP configuration indicates a first CP ratio for an initial symbol of the SC waveform and a second CP ratio different from the first CP ratio for one or more symbols after the initial symbol of the SC waveform.

Some examples of the method, apparatuses, and non-transitory computer-readable medium described herein may further include operations, features, means, or instructions for determining the first CP ratio and the second CP ratio based on a subcarrier spacing associated with the SC waveform, identifying a first CP for the initial symbol based on the first CP ratio, and identifying at least one additional CP for the one or more symbols after the initial symbol based on the second CP ratio, where the second CP ratio may be less than the first CP ratio.

Some examples of the method, apparatuses, and non-transitory computer-readable medium described herein may further include operations, features, means, or instructions for receiving the SC waveform including the first CP and the at least one additional CP from the transmitting device.

In some examples of the method, apparatuses, and non-transitory computer-readable medium described herein, a number of samples for the first CP and a number of samples for the at least one additional CP may be based on the subcarrier spacing.

Some examples of the method, apparatuses, and non-transitory computer-readable medium described herein may further include operations, features, means, or instructions for determining the first CP ratio and the second CP ratio based on a BWP associated with the SC waveform, identifying a first CP for the initial symbol based on the first CP ratio, and identifying at least one additional CP for the one or more symbols after the initial symbol based on the second CP ratio, where the second CP ratio may be less than the first CP ratio.

In some examples of the method, apparatuses, and non-transitory computer-readable medium described herein, a number of samples for the first CP and a number of samples for the at least one additional CP may be based on a number of the set of RBs of the BWP.

Some examples of the method, apparatuses, and non-transitory computer-readable medium described herein may further include operations, features, means, or instructions for receiving the SC waveform including the first CP and the at least one additional CP from the transmitting device.

A method of wireless communications at a transmitting device is described. The method may include identifying a transmission configuration for an SC waveform, the transmission configuration indicating a set of RBs allocated for communications with a receiving device and a CP ratio for a CP of the SC waveform, allocating a set of REs of the set of RBs for the SC waveform that includes the CP based on the transmission configuration and the CP ratio, and transmitting the SC waveform including the CP to the receiving device via the set of REs in accordance with the CP ratio.

An apparatus for wireless communications at a transmitting device is described. The apparatus may include a processor, memory in electronic communication with the processor, and instructions stored in the memory. The instructions may be executable by the processor to cause the apparatus to identify a transmission configuration for an SC waveform, the transmission configuration indicating a set of RBs allocated for communications with a receiving device and a CP ratio for a CP of the SC waveform, allocate a set of REs of the set of RBs for the SC waveform that includes the CP based on the transmission configuration and the CP ratio, and transmit the SC waveform including the CP to the receiving device via the set of REs in accordance with the CP ratio.

Another apparatus for wireless communications at a transmitting device is described. The apparatus may include means for identifying a transmission configuration for an SC waveform, the transmission configuration indicating a set of RBs allocated for communications with a receiving device and a CP ratio for a CP of the SC waveform, allocating a set of REs of the set of RBs for the SC waveform that includes the CP based on the transmission configuration and the CP ratio, and transmitting the SC waveform including the CP to the receiving device via the set of REs in accordance with the CP ratio.

A non-transitory computer-readable medium storing code for wireless communications at a transmitting device is described. The code may include instructions executable by a processor to identify a transmission configuration for an SC waveform, the transmission configuration indicating a set of RBs allocated for communications with a receiving device and a CP ratio for a CP of the SC waveform, allocate a set of REs of the set of RBs for the SC waveform that includes the CP based on the transmission configuration and the CP ratio, and transmit the SC waveform including the CP to the receiving device via the set of REs in accordance with the CP ratio.

Some examples of the method, apparatuses, and non-transitory computer-readable medium described herein may further include operations, features, means, or instructions for determining a CP configuration for the SC waveform based on the transmission configuration, where the CP configuration indicates a first CP ratio for an initial symbol of the SC waveform and a second CP ratio different from the first CP ratio for one or more symbols after the initial symbol of the SC waveform.

Some examples of the method, apparatuses, and non-transitory computer-readable medium described herein may further include operations, features, means, or instructions for determining the first CP ratio and the second CP ratio based on a subcarrier spacing associated with the SC waveform, generating a first CP for the initial symbol based on the first CP ratio, and generating at least one additional CP for the one or more symbols after the initial symbol based on the second CP ratio, where the second CP ratio may be less than the first CP ratio.

Some examples of the method, apparatuses, and non-transitory computer-readable medium described herein may further include operations, features, means, or instructions for transmitting the SC waveform including the first CP and the at least one additional CP to the receiving device.

In some examples of the method, apparatuses, and non-transitory computer-readable medium described herein, a number of samples for the first CP and a number of samples for the at least one additional CP may be based on a subcarrier spacing.

Some examples of the method, apparatuses, and non-transitory computer-readable medium described herein may further include operations, features, means, or instructions for determining the first CP ratio and the second CP ratio based on a BWP associated with the SC waveform, generating a first CP for the initial symbol based on the first CP ratio, and generating at least one additional CP for the one or more symbols after the initial symbol based on the second CP ratio, where the second CP ratio may be less than the first CP ratio.

In some examples of the method, apparatuses, and non-transitory computer-readable medium described herein, a number of samples for the first CP and a number of samples for the at least one additional CP may be based on a number of the set of RBs of the BWP.

Some examples of the method, apparatuses, and non-transitory computer-readable medium described herein may further include operations, features, means, or instructions for transmitting the SC waveform including the first CP and the at least one additional CP to the receiving device.

A method of wireless communications at a receiving device is described. The method may include identifying a transmission configuration for an SC waveform, the transmission configuration indicating a set of RBs allocated for communications with a transmitting device and a CP ratio for a CP of the SC waveform, determining a set of REs of the set of RBs for the SC waveform that includes the CP based on the transmission configuration and the CP ratio, and receiving the SC waveform including the CP from the transmitting device via the set of REs in accordance with the CP ratio.

An apparatus for wireless communications at a receiving device is described. The apparatus may include a processor, memory in electronic communication with the processor, and instructions stored in the memory. The instructions may be executable by the processor to cause the apparatus to identify a transmission configuration for an SC waveform, the transmission configuration indicating a set of RBs allocated for communications with a transmitting device and a CP ratio for a CP of the SC waveform, determine a set of REs of the set of RBs for the SC waveform that includes the CP based on the transmission configuration and the CP ratio, and receive the SC waveform including the CP from the transmitting device via the set of REs in accordance with the CP ratio.

Another apparatus for wireless communications at a receiving device is described. The apparatus may include means for identifying a transmission configuration for an SC waveform, the transmission configuration indicating a set of RBs allocated for communications with a transmitting device and a CP ratio for a CP of the SC waveform, determining a set of REs of the set of RBs for the SC waveform that includes the CP based on the transmission configuration and the CP ratio, and receiving the SC waveform including the CP from the transmitting device via the set of REs in accordance with the CP ratio.

A non-transitory computer-readable medium storing code for wireless communications at a receiving device is described. The code may include instructions executable by a processor to identify a transmission configuration for an SC waveform, the transmission configuration indicating a set of RBs allocated for communications with a transmitting device and a CP ratio for a CP of the SC waveform, determine a set of REs of the set of RBs for the SC waveform that includes the CP based on the transmission configuration and the CP ratio, and receive the SC waveform including the CP from the transmitting device via the set of REs in accordance with the CP ratio.

Some examples of the method, apparatuses, and non-transitory computer-readable medium described herein may further include operations, features, means, or instructions for determining a CP configuration for the SC waveform based on the transmission configuration, where the CP configuration indicates a first CP ratio for an initial symbol of the SC waveform and a second CP ratio different from the first CP ratio for one or more symbols after the initial symbol of the SC waveform.

Some examples of the method, apparatuses, and non-transitory computer-readable medium described herein may further include operations, features, means, or instructions for determining the first CP ratio and the second CP ratio based on a subcarrier spacing associated with the SC waveform, identifying a first CP for the initial symbol based on the first CP ratio, and identifying at least one additional CP for the one or more symbols after the initial symbol based on the second CP ratio, where the second CP ratio may be less than the first CP ratio.

Some examples of the method, apparatuses, and non-transitory computer-readable medium described herein may further include operations, features, means, or instructions for receiving the SC waveform including the first CP and the at least one additional CP from the transmitting device.

In some examples of the method, apparatuses, and non-transitory computer-readable medium described herein, a number of samples for the first CP and a number of samples for the at least one additional CP may be based on the subcarrier spacing.

Some examples of the method, apparatuses, and non-transitory computer-readable medium described herein may further include operations, features, means, or instructions for determining the first CP ratio and the second CP ratio based on a BWP associated with the SC waveform, identifying a first CP for the initial symbol based on the first CP ratio, and identifying at least one additional CP for the one or more symbols after the initial symbol based on the second CP ratio, where the second CP ratio may be less than the first CP ratio.

In some examples of the method, apparatuses, and non-transitory computer-readable medium described herein, a number of samples for the first CP and a number of samples for the at least one additional CP may be based on a number of the set of RBs of the BWP.

Some examples of the method, apparatuses, and non-transitory computer-readable medium described herein may further include operations, features, means, or instructions for receiving the SC waveform including the first CP and the at least one additional CP from the transmitting device.

DETAILED DESCRIPTION

Figure 1:
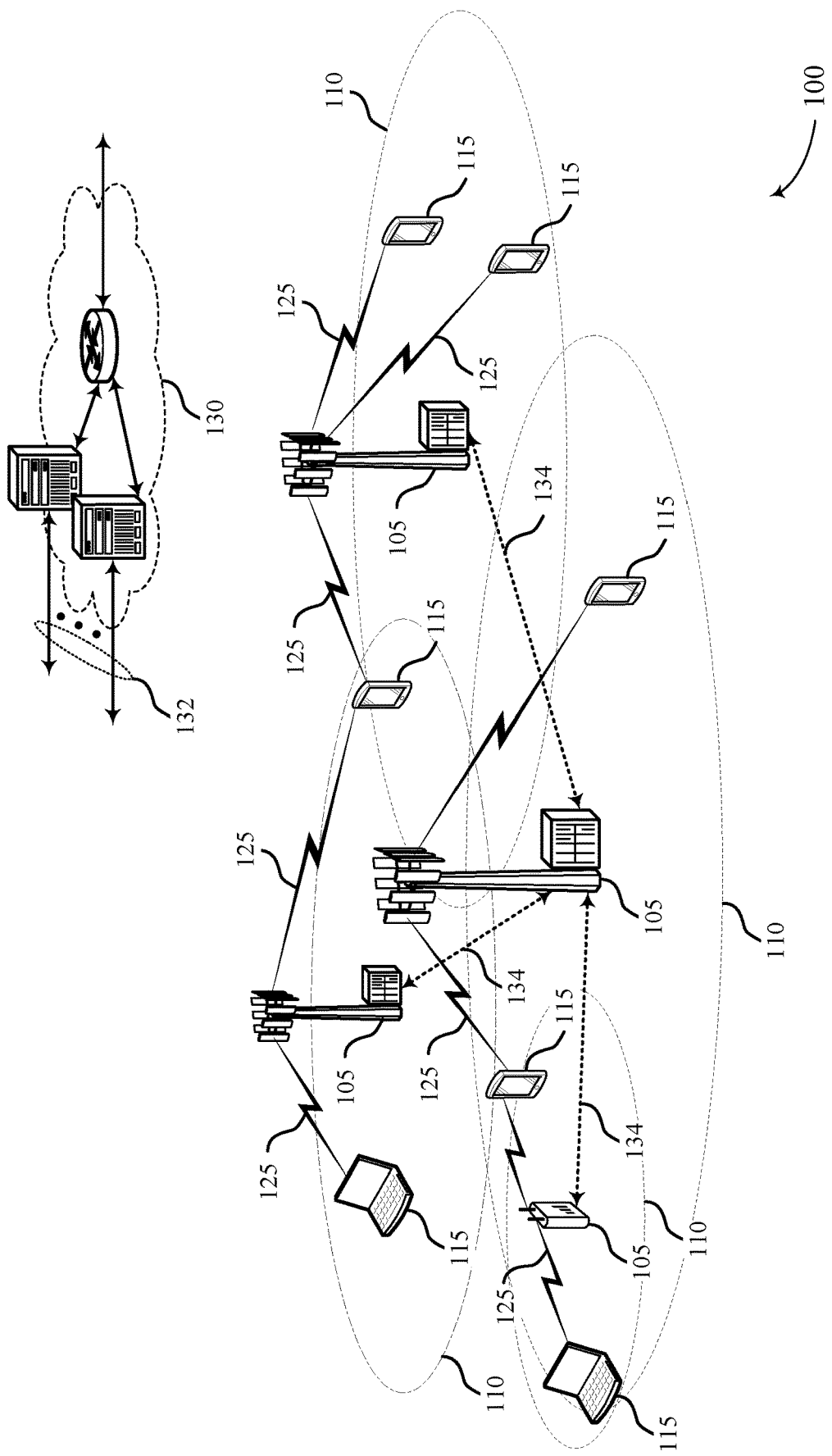
FIG. 1 illustrates an example of a wireless communications system that supports flexible single carrier (SC) waveforms in accordance with aspects of the present disclosure.

Some wireless devices (e.g., a user equipment (UE) or a base station) may transmit information using single carrier (SC) waveforms (e.g., signals) generated using up-sampling and up-conversion processes (e.g., via an SC transmitter). In some cases, generating an SC signal may also include a cyclic prefix (CP) appended to, or otherwise included with, the information to be transmitted. From the receiver perspective, wireless devices may receive information transmitted using SC signals (e.g., via an SC receiver) using down-conversion, down-sampling, and equalization (e.g., time domain or frequency domain equalization) processes. Receiving wireless devices may also remove a CP from transmitted information as part of the reception process. In some examples, a receiving wireless device may implement an SC receiver in the time domain, which may result in lower complexity at the receiver.

Some wireless communications devices may benefit from the use of an SC waveform for uplink or downlink communications. For example, communications using an SC waveform may have a low peak to average power ratio (PAPR) and in some cases, may be implemented with low complexity at a transmitter and a receiver. In one example, a base station may transmit SC downlink communications to a UE, and the UE may implement an SC receiver in the time domain to lower complexity and increase power savings when receiving the downlink communications. Additionally or alternatively, a UE may transmit SC uplink communications to a base station, and the lower PAPR of the SC signaling may increase power savings at the UE.

In some cases, however, the CP used in SC waveforms may restrict frequency resources to a limited resource set. For example, some SC signals may have an established ratio of CP length to data length, where the ratio may limit a number of input data (e.g., K) or output data (e.g., N) from an SC transmitter to a certain number of resource elements (REs) such that the CP may have an integer length. An SC transmitter may be limited to transmit on a number of REs that is a multiple of a number K, where in some cases, K may represent half of the largest common denominator of a CP to data ratio. In some examples, K REs may not correspond to an integer number of resource blocks (RBs), and the transmitter may therefore determine to transmit on a number of REs that is a multiple of K and which also corresponds to an integer number of RBs. Additionally or alternatively, an SC transmitter may determine to transmit on a number of REs that does not correspond to an integer number of RBs.

As such, a UE and a base station may employ an SC configuration (e.g., SC transmission configuration) to identify REs (e.g., within an RB set) allocated for sending uplink or downlink SC signals (e.g., because not all REs within an allocation of RBs may be used). Additionally or alternatively, the UE and the base station may employ an SC configuration with a different CP length in order to change a base amount of REs that may be allocated for an SC transmission (e.g., while maintaining an integer amount of CPs), where the different CP length may be static or dynamic. In some examples, the base station may transmit an indication of an SC configuration via cell signaling or via a control message (e.g., downlink control information (DCI)). Accordingly, the UE may receive the configuration message, may decode the message, and may implement an SC transmitter or an SC receiver to process corresponding SC transmissions (e.g., downlink or uplink communications) according to the indicated SC configuration.

Some SC configurations may indicate the REs within an RB allocation on which to transmit or receive communications. For example, in some cases, the used or occupied REs may span a center portion of the allocated RBs, leaving the REs at the edges of the allocated RBs unoccupied. In other examples, the base station may indicate for the occupied REs to start from a top edge, bottom edge, center, etc. of the RB allocation. In some cases, the base station may indicate which REs are to be occupied with an RE identifier (REID), which, in some cases, may be a function of a cell identifier (ID) of a cell supported by the base station. Additionally or alternatively, the base station may employ an SC configuration with a different, fixed CP length (e.g., CP to data ratio) in order to adjust the number of REs allocated for an SC transmission (e.g., in order to utilize an integer number of RBs). For example, the base station may specify a new ratio of CP length to data length, causing a value of K to decrease, where a smaller K value may allow for finer granularity when allocating RB sets.

In some examples, the base station may similarly employ an SC configuration with a dynamic CP length (e.g., CP to data ratio). In some cases, the dynamic CP ratio may change based on the bandwidth used for transmissions. When using a dynamic CP ratio, a total amount of CP samples may be split uniformly across a transmission time interval (TTI), while folding a remainder into a first symbol of the TTI. In some cases, a dynamic CP length may increase utility of a CP by increasing a length of a smallest CP within a TTI in relation to a largest CP within the TTI. In some examples, the dynamic CP length may be implemented when an assignment bandwidth is known or defined and may be used across all UEs within the bandwidth (e.g., to facilitate frequency domain processing).

Aspects of the disclosure are initially described in the context of wireless communications systems. Aspects are then described with respect to RB and CP schemes, signal processing flows, and a process flow. Aspects of the disclosure are further illustrated by and described with reference to apparatus diagrams, system diagrams, and flowcharts that relate to flexible SC waveforms.

FIG. 1 illustrates an example of a wireless communications system 100 that supports flexible SC waveforms in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas.

Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the CP prepended to each symbol period). Excluding the CP, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing (SCS) or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, an RE may consist of one symbol period (e.g., a duration of one modulation symbol) and one subcarrier, where the symbol period and SCS are inversely related. The number of bits carried by each RE may depend on the modulation scheme (e.g., the order of the modulation scheme). Thus, the more REs that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and SCS may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, devices in a wireless communications system may transmit and receive information using an SC waveform, such as a DFT-S-OFDM waveform. Some SC transmitters may transmit SC waveforms processing information to be transmitted using a discrete Fourier transform (DFT), a tone mapping, and an inverse fast Fourier transform (IFFT). In some cases, the length of input samples (e.g., a length K) to a DFT operator may be restricted (e.g., limited to having simple components) in order to lower complexity. For example, the DFT input sample length K may be restricted to any multiple of two, three, or five. In some cases, the IFFT output may create samples with an output sample length of N, which may be a different number than K. The transmitter may append a guard interval or CP to the generated signal and a transmitter front end (FE) may convert the signal from a digital to an analog form. A signal generated in this manner may, in some examples, be transmitted via any part of the system bandwidth.

Similarly, a wireless device (e.g., a base station 105 or a UE 115) may use an SC receiver to receive and process SC waveforms and obtain information transmitted within the waveforms. Some SC receivers may receive an analog signal at a receiver front end (FE), where the receiver FE may convert the signal from analog to digital form. The SC receiver may, in some cases, remove the CP, perform a fast Fourier transform (FFT) operation (e.g., of size N) on the digital signal, demap the tones, perform a frequency equalization (e.g., minimum mean square error equalization (MMSE-EQ)), perform an inverse DFT (IDFT) operation (e.g., of size K), and begin decoding the signal information (e.g., via log likelihood ratio (LLR) computations).

In some cases, however, the CP used in SC waveforms may restrict frequency resources to a limited resource set. For example, some SC signals may have an established ratio of CP length to data length, where the ratio may limit a number of input data (e.g., K) or output data (e.g., N) from an SC transmitter to a certain number of REs such that the CP may have an integer length. An SC transmitter may be limited to transmit on a number of REs that is a multiple of a number K, where in some cases, K may represent half of the largest common denominator of a CP to data ratio. In some cases, K REs may not correspond to an integer number of RBs, and the transmitter may therefore determine to transmit on a number of REs that is a multiple of K and which also corresponds to an integer number of RBs. Additionally or alternatively, an SC transmitter may determine to transmit on a number of REs that does not correspond to an integer number of RBs.

As such, a UE 115 and a base station 105 may employ an SC configuration to identify REs (e.g., within an RB set) to allocate for sending uplink or downlink SC signals (e.g., because not all REs within an allocation of RBs may be used). Additionally or alternatively, the UE 115 and the base station 105 may employ an SC configuration with a different CP length in order to change a base amount of REs that may be allocated for an SC transmission (e.g., while maintaining an integer amount of CPs), where the different CP length may be either static or dynamic. In one example, the base station 105 may transmit an indication of an SC configuration via cell signaling, such as within an RRC message, or via a control message (e.g., DCI). Accordingly, the UE 115 may receive the RRC message or control message, may decode the message, and may implement an SC transmitter or an SC receiver to process corresponding SC transmissions (e.g., downlink or uplink communications) according to the indicated SC configuration.

Figure 2:
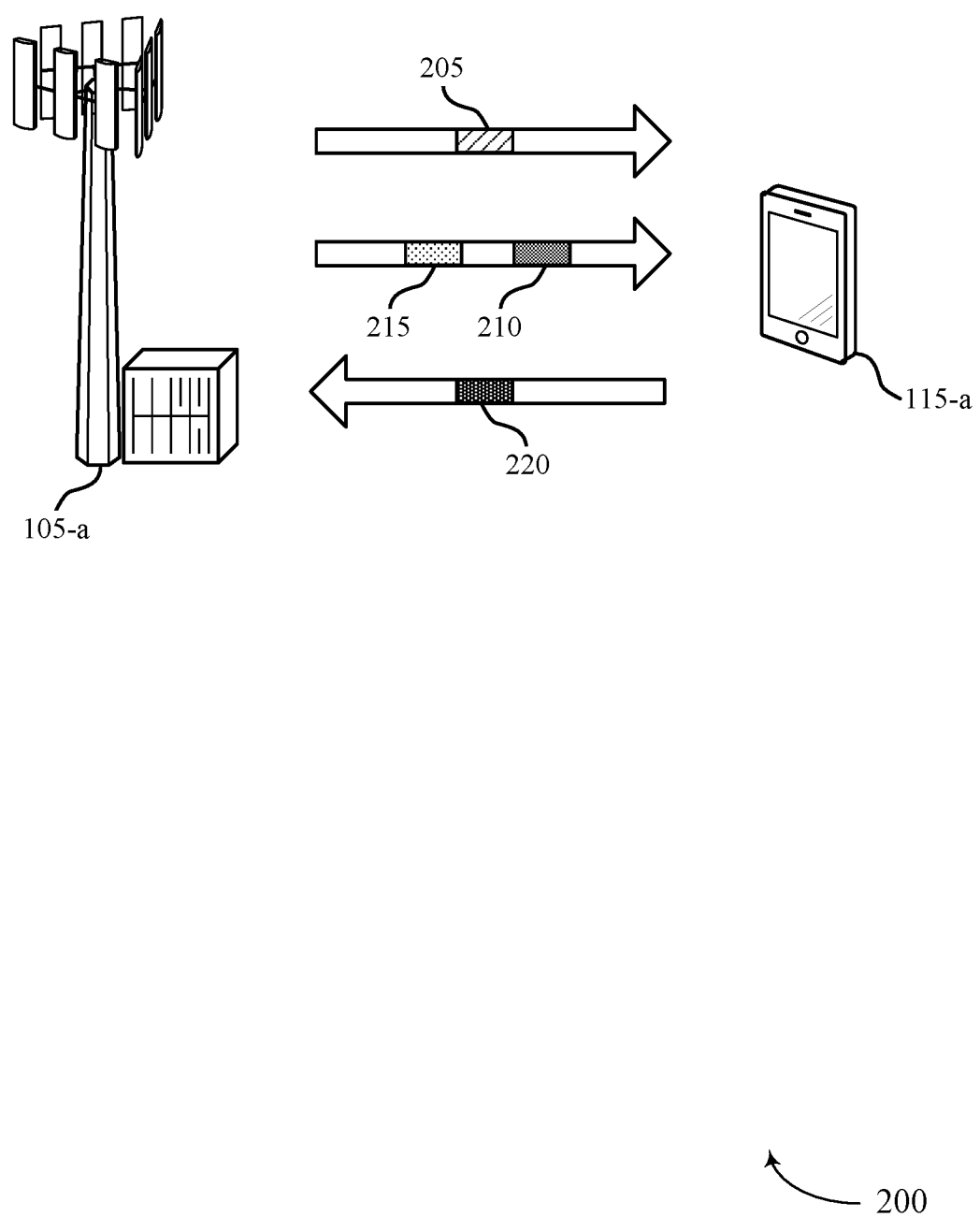
FIG. 2 illustrates an example of a wireless communications system that supports flexible SC waveforms in accordance with aspects of the present disclosure.

FIG. 2 illustrates an example of a wireless communications system 200 that supports flexible SC waveforms in accordance with aspects of the present disclosure. In some examples, wireless communications system 200 may implement aspects of wireless communications system 100 and may include a base station 105-a and a UE 115-a, which may be examples of a UE 115 and a base station 105 described with reference to FIG. 1. In some cases, UE 115-a or base station 105-a may use an SC waveform for uplink or downlink transmissions, respectively, and may configure the SC waveform using an SC transmission configuration.

UE 115-a and base station 105-a may transmit some SC waveforms (e.g., SC-FDM signals) using a signal generation or transmission process as described with reference to FIG. 1. Additionally or alternatively, UE 115-a and base station 105-a may generate SC signals using up-sampling and up-conversion processes (e.g., to achieve the same results as DFT, tone mapping, and IFFT processes). For example, an SC transmitter of a transmitting device may add a CP (e.g., in the time domain) to information for transmission and may up-sample the information from a first number of samples (e.g., K samples) to a second number of samples (e.g., N samples), using an up-sampling ratio (e.g., N/K). Further, the SC transmitter may apply an up-sampling pulse shaping filter function (e.g., a sinc function), where the pulse-shaping may, in some cases, lead to some PAPR growth. In other cases (e.g., based on a shape of the pulse shaping filter), the SC transmitter may achieve a lower PAPR and a wider bandwidth occupation. Additionally or alternatively, the pulse shaping filter may be chosen such that the transmission occupies a fraction of the system bandwidth (e.g., to allow for UE multiplexing). In some cases, the up-conversion process may be implemented by an up-conversion at a receiver FE or by time domain phase ramping.

In some cases, the SC transmitter may reduce complexity by limiting the up-sampling ratio of N/K to a simple ratio, and may also reduce complexity by using a shorter pulse shaping filter. Additionally, the SC transmitter may move an SC signal to a desired frequency (e.g., within a frequency band) by choosing a proper phase ramp, or in some cases, the SC transmitter may leave the selection of the phase ramp to a mixer. In some examples, UE 115-*a* and base station 105-*a* may implement the SC transmitter in the time domain, which may result in higher complexity.

UE 115-*a* and base station 105-*a* may receive some SC waveforms (e.g., SC-FDM signals) using a signal reception process as described with reference to FIG. 1. Additionally or alternatively, UE 115-*a* and base station 105-*a* may receive SC signals using down-conversion, down-sampling, and equalization (e.g., time domain or frequency domain equalization) processes (e.g., to achieve the same results as FFT, tone demapping, and IDFT processes). Further, the SC receiver may match a pulse shaping filter used by the transmitting device (e.g., in order to undo filtering operations). In some examples, an SC receiver may implement the down-conversion process by performing a down-conversion of time domain phase ramping at a receiver FE. Additionally, the SC receiver may perform down-sampling as a part of a signal sampling or equalization process and in some cases, the SC receiver may use either a frequency domain equalization or a time domain equalization process. The SC receiver may further reduce complexity by limiting the down-sampling ratio of N/K to a simple ratio, and may also reduce complexity by using a shorter time domain equalizer. In some cases, the complexity of the processes performed by the SC filter may be proportional to a number of taps in a time domain equalizer. In some examples, UE 115-*a* and base station 105-*a* may implement the SC receiver in the time domain, and in some cases, this implementation may result in lower complexity.

Some types of wireless communications devices may benefit from the use of an SC waveform as compared to other waveforms (e.g., OFDM waveforms, etc.). For example, communications using an SC waveform may have a low PAPR and in some cases, may be implemented with low complexity at a transmitter and a receiver. In one example, base station 105-*a* may transmit SC-FDM downlink communications (e.g., one or more downlink messages 215) to UE 115-*a*, and UE 115-*a* may implement an SC receiver in the time domain to receive the downlink communications while lowering complexity and increasing power savings. Additionally or alternatively, UE 115-*a* may transmit SC-FDM uplink communications (e.g., one or more uplink messages 220) to base station 105-*a*, where a lower PAPR of the SC-FDM uplink signaling may increase power savings at UE 115-*a*.

Some SC signals (e.g., SC-FDM waveforms) may have an established ratio of CP length to data duration, such as a ratio of CP to data of 144:2048 samples (e.g., which can be reduced to 9:128 samples). In some cases, an SC-FDM CP may be longer for a first symbol at the beginning of a TTI (e.g., 160:2048 or 176:2048 CP to data sample ratio), where the longer CP may still have a CP to data ratio with a same largest common denominator as other CPs within the TTI (e.g., 128). In some examples, the length of the CP may depend on an SCS of a frequency band for the corresponding transmissions. Some ratios of CP to data may limit a number of input data (e.g., K) or output data (e.g., N) from an SC transmitter to be a multiple of the largest common denominator of the CP to data ratio (e.g., 128 samples), such that the CP may have an integer length. In one example, an SC transmitter may be limited to a value of 128 samples for a CP and may employ an up-sampling rate of two. As such, K may be limited to a multiple of 64 (e.g., to ensure that N is a multiple of 128), or in other words, the SC transmitter may be limited to transmit over a multiple of 64 REs. In some cases, K may also be limited to a multiple of two, three, or five, as discussed with reference to FIG. 1.

An SC transmitter may be limited to transmit on a number of REs that is a multiple of a number K (e.g., half of the largest common denominator of the CP to data ratio). In some cases, K REs may not correspond to an integer number of RBs, and the transmitter may therefore determine to transmit on a number of REs that is a multiple of K and which also corresponds to an integer number of RBs. For example, the SC transmitter may determine to transmit using 192 REs, corresponding to 16 RBs or three units of 64 REs, or may determine to transmit using 384 REs, corresponding to 32 RBs or six units of 64 REs. However, this process may limit resource assignments. Accordingly, an SC transmitter may determine to transmit on a multiple of K REs where the multiple does not correspond to an integer number of RBs (e.g., may transmit on a number of REs that is not a complete number of RBs). This process may provide more values for possible resource bandwidth allocation, as illustrated in Tables 1 and 2, which illustrate examples where K may be limited to 64 REs and where each RB may include 12 REs. Table 1 shows a scenario where the SC transmitter may be limited to transmit on an integer number of RBs (e.g., where 16 RBs may be the lowest integer number of RBs that is also a multiple of 64 REs). Table 2 shows a scenario where the SC transmitter may be free to transmit on any multiple of K (e.g., 64) REs that is also a multiple of two, three, or five. Tables 1 and 2 show examples within a same range or spectrum of frequencies.

TABLE 1

Resource Combinations for an Integer Number of RBs and Multiples of 64 REs

| Number of RB sets (Y) | Total Number of RBs (16Y) | Occupied Bandwidth (MHz, at 960 kHz SCS) | Occupied Bandwidth (MHz, at 1.92 GHz SCS) |
|---|---|---|---|
| 1 | 16 | 184.32 | 368.64 |
| 2 | 32 | 368.64 | 737.28 |
| 3 | 48 | 552.96 | 1105.92 |
| 4 | 64 | 737.28 | 1474.56 |
| 5 | 80 | 921.6 | 1843.2 |
| 6 | 96 | 1105.92 | N/A |
| 8 | 128 | 1474.56 | N/A |
| 9 | 144 | 1658.88 | N/A |
| 10 | 160 | 1843.2 | N/A |

TABLE 2

Resource Combinations for Multiples of 64 REs That Are Also Multiples of 2, 3, or 5

| Number of RE sets (X) | Total Number of RBs (64X/12) | Occupied Bandwidth (MHz, at 960 kHz SCS) | Occupied Bandwidth (MHz, at 1.92 GHz SCS) |
|---|---|---|---|
| 1 | 5⅓ | 61.44 | 122.88 |
| 2 | 10⅔ | 122.88 | 245.76 |
| 3 | 16 | 184.32 | 368.64 |
| 4 | 21⅓ | 245.76 | 491.52 |
| 5 | 26⅔ | 307.2 | 614.4 |
| 6 | 32 | 368.64 | 737.28 |
| 8 | 42⅔ | 491.52 | 983.04 |
| 9 | 48 | 552.96 | 1105.92 |
| 10 | 53⅓ | 614.4 | 1228.8 |
| 12 | 64 | 737.28 | 1474.56 |

TABLE 2-continued

Resource Combinations for Multiples of 64
REs That Are Also Multiples of 2, 3, or 5

| Number of RE sets (X) | Total Number of RBs (64X/12) | Occupied Bandwidth (MHz, at 960 kHz SCS) | Occupied Bandwidth (MHz at 1.92 GHz SCS) |
|---|---|---|---|
| 15 | 80 | 921.6 | 1843.2 |
| 16 | 85⅓ | 983.04 | 1966.08 |
| 18 | 96 | 1105.92 | N/A |
| 20 | 106⅔ | 1228.8 | N/A |
| 24 | 128 | 1474.56 | N/A |
| 25 | 133⅓ | 1536 | N/A |
| 27 | 144 | 1658.88 | N/A |
| 30 | 160 | 1843.2 | N/A |

Accordingly, UE 115-a and base station 105-a may employ an SC configuration to determine which REs (e.g., within an RB set) to allocate for sending uplink or downlink SC signals (e.g., because not all REs within an allocation of RBs may be used). Additionally or alternatively, UE 115-a and base station 105-a may employ an SC configuration with a different CP length in order to change a base amount of REs that may be allocated for an SC transmission, where the different CP length may be either static or dynamic.

In one example, base station 105-a may transmit an indication of an SC configuration via cell signaling, such as within an RRC message 205. Additionally or alternatively, base station 105-a may transmit an indication of an SC configuration in a control message 210 (e.g., DCI), where the control message may correspond to one or more SC-FDM downlink messages 215 or one or more SC-FDM uplink messages 220. UE 115-a may receive RRC message 205 or control message 210, may decode the message(s), and may implement an SC transmitter or an SC receiver on corresponding SC transmissions (e.g., downlink message(s) 215 or uplink message(s) 220) according to the indicated SC configuration.

As described herein, some SC configurations may indicate the REs within an RB allocation on which to transmit or receive communications. For example, in some cases, the occupied REs may span a center portion of the allocated RBs, leaving the edges unoccupied. In other examples, base station 105-a may indicate for the occupied REs to start from a top edge, bottom, edge, center, etc. of the RB allocation. In some cases, base station 105-a may indicate which REs are to be used with an REID value, which, in some cases, may be a function of a cell ID. In some examples, the RB allocation may be based on an amount of REs within an RB (e.g., 12 REs), while a demodulation reference signal (DMRS) pattern, DMRS length, and transmission block size (TBS) may be based on a multiple of a number REs to be allocated or used for transmissions (e.g., 64 REs).

Additionally or alternatively, base station 105-a may employ an SC configuration with a different CP length (e.g., CP to data ratio) in order to decrease a base number of REs that may be allocated for an SC transmission (e.g., while fully using an integer number of RBs). For example, while using an up-sampling ratio of two, instead of using a ratio of CP to data of 144:2048, base station 105-a may specify a ratio of 128:2048 (e.g., which may reduce to 1:16), thus setting K to a value of eight (e.g., in order to obtain an integer CP length, or that N is a multiple of 16) and increasing the granularity of resource schedules. In this example, if an RB has a size of 12 REs, resources may be allocated using 2 RBs (e.g., 24 REs) without leaving any REs unused. The different CP length may decrease the overall CP duration (e.g., by a factor of 11%) and may be used by various waveforms, such as OFDM, SC-FDM, SC quadrature amplitude modulation (QAM), etc.

In some examples, base station 105-a may employ an SC configuration with a dynamic CP length (e.g., CP to data ratio) in order to decrease a base number of REs that may be allocated for an SC transmission (e.g., while fully using an integer number of RBs). In some cases, the CP ratio may be based on a bandwidth used for transmissions. A total number of CP samples may be split uniformly across a TTI (e.g., 0.5 ms), while folding a remainder of CP samples into a first symbol of the TTI. For example, for a 15 kHz SCS and a 100 RB allocation, base station 105-a may configure a first symbol CP with a length of 90 samples (e.g., CP to data ratio of 90:1200) and a CP length of 85 samples (e.g., CP to data ratio of 85:1200) for other symbols. In some cases, a dynamic CP length may increase utility of a CP by increasing a size of a smallest CP within a TTI in relation to a largest CP within the TTI. In some examples, the dynamic CP length may be implemented when an assignment bandwidth is known or defined and may be used across all UEs 115 within the bandwidth (e.g., to facilitate frequency domain processing).

Figure 3:
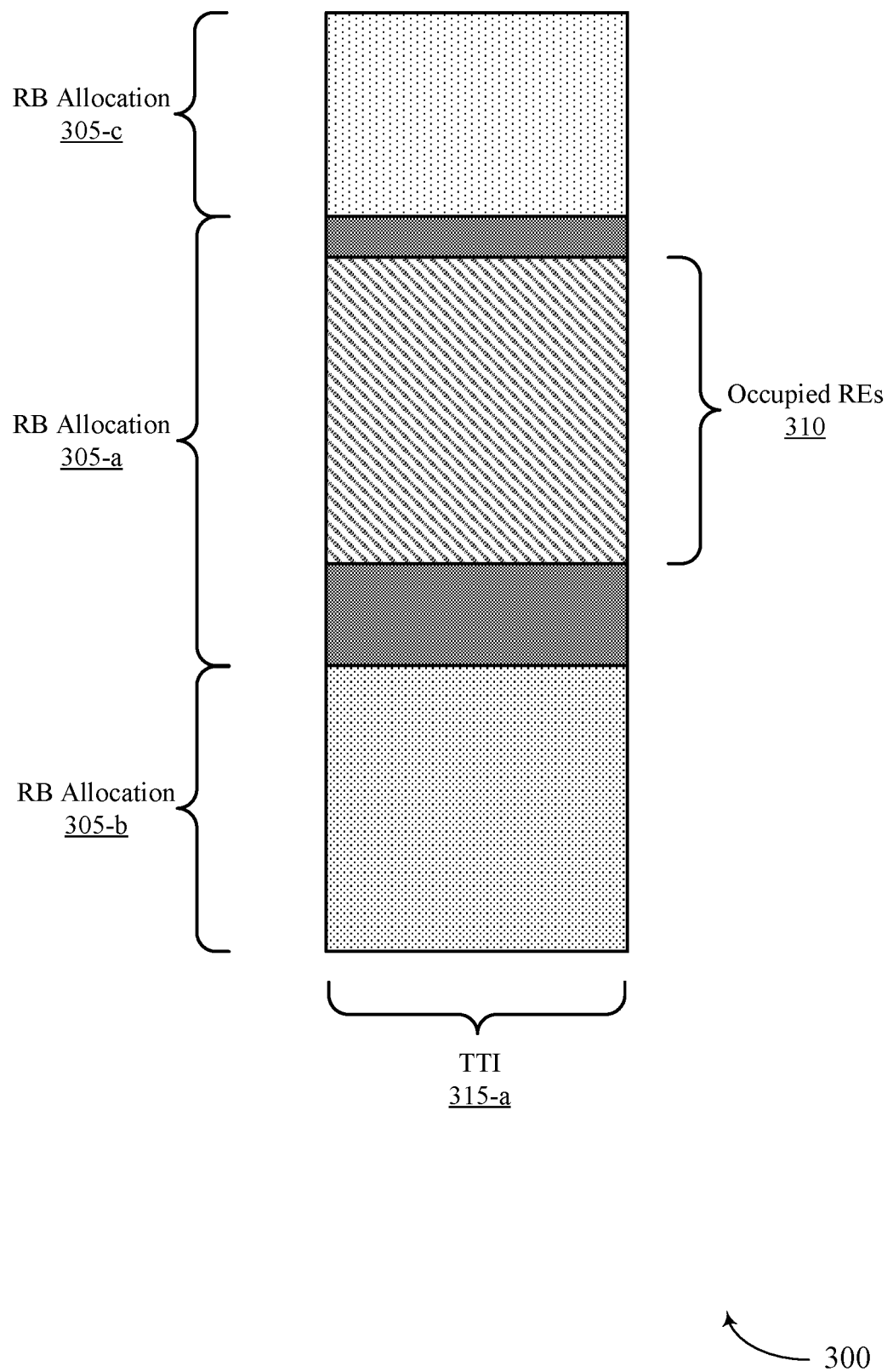
FIG. 3 illustrates an example of a resource block (RB) scheme that supports flexible SC waveforms in accordance with aspects of the present disclosure.

FIG. 3 illustrates an example of an RB scheme 300 that supports flexible SC waveforms in accordance with aspects of the present disclosure. In some examples, RB scheme 300 may implement aspects of wireless communications systems 100 or 200 and may be implemented by a base station 105 and a UE 115, which may be examples of a base station 105 and a UE 115 described with reference to FIGS. 1 and 2. In some cases, the UE 115 and the base station 105 may use an SC waveform for uplink or downlink transmissions and may transmit the SC waveform using an SC transmission configuration.

In some examples, the SC transmission configuration may include an indication (e.g., via an RRC message or a control message) of REs to be used for one or more uplink or downlink communications between the base station 105 and the UE 115. The base station 105 may communicate with multiple UEs 115 on the uplink or downlink and may assign one or more RB allocations 305 (e.g., each with an integer number of RBs) for uplink or downlink communications with the multiple UEs 115, over one or more TTIs 315. For example, the base station 105 may assign RB allocation 305-a for uplink or downlink communications with the UE 115 during TTI 315-a, and may assign RB allocations 305-b and 305-c for communications with one or more other UEs 115 during TTI 315-a. Further, the base station 105 may employ an SC configuration where transmissions (e.g., uplink or downlink transmissions) may be made on a number of REs corresponding to a base number K (e.g., transmissions may take place on a number of REs that is a multiple of K), as discussed with reference to FIG. 2. In some cases, the base station 105 or the UE 115 may transmit on a number of REs that is a multiple of K but that does not correspond to an integer number of RBs. As such, the base station 105 may indicate an SC configuration (e.g., via an RRC message or a control message) that specifies an amount and a location of REs (e.g., occupied REs 310) to be used for uplink or downlink transmissions. The UE 115 may use the SC configuration to process information contained in occupied REs 310 for downlink communications or transmit information in occupied REs 310 for uplink communications.

For example, the base station 105 may assign six RBs to the UE 115 in RB allocation 305-a (e.g., for downlink or uplink communications), where each RB may include 12 REs. In some cases, the base station 105 may indicate (e.g., via RRC or control messaging) that occupied REs 310 of the uplink or downlink transmission may include 64 REs (e.g., where K may be 64) out of the 72 REs available within RB allocation 305-a (e.g., eight REs may be left unoccupied). In other examples, the base station 105 may assign a different number of RBs to the UE 115 in RB allocation 305-a, and occupied REs 310 may also represent a different number of REs based on a multiple of a number K. Further, the base station 105 may also indicate (e.g., via RRC or control messaging) a location of occupied REs 310 within RB allocation 305-a.

In some examples, the base station 105 may indicate that occupied REs 310 span the center portion of RB allocation 305-a, while leaving the edge REs unoccupied. In such cases, the unused REs may serve as a guard for bandwidth expansion pulse shaping. In some discrete Fourier transform spread (DFT-S) implementations, spanning the center portion of RB allocation 305-a may involve fractional RBs on both edges of RB allocation 305-a. In other examples, the base station 105 may indicate where occupied REs 310 are located within RB allocation 305-a (e.g., based on a transmission characteristic, a serving cell, a time interval, etc.). For example, the base station 105 may map occupied REs 310 starting from the top edge, bottom edge, center RE, or other specified locations within RB allocation 305-a. In some cases, the base station 105 may employ an REID (e.g., similar to a redundancy version ID (RVID) in a frequency domain), which the UE 115 may use to identify occupied REs 310 within RB allocation 305-a. For example, the base station 105 may indicate a starting RE (e.g., top RE, bottom RE, center RE, etc.) and an ending RE for occupied REs 310, using REIDs. Additionally or alternatively, the base station 105 may use an REID to indicate a starting RE (e.g., top RE (e.g., an RE associated with the lowest RE index of the set of REs), bottom RE (e.g., an RE associated with the highest RE index of the set of REs), center RE (e.g., an RE associated with a middle RE index of the set of REs), etc.) for occupied REs 310, and may indicate a number of occupied REs 310 and a direction (e.g., in a frequency domain) for occupied REs 310 within RB allocation 305-a. The base station 105 may perform similar operations for RB allocations 305-b and 305-c, with one or more other UEs 115.

In some cases, the REIDs used within RB allocation 305-a may be a function of cell ID such that different cells may use different REIDs to randomize interference across cells. The base station 105 may indicate REIDs in an RRC configuration (e.g., RRC message) or a DCI (e.g., control message), and in some cases, the base station 105 may change a DCI format to include an indication of a radio network temporary identifier (RNTI) differentiation for REIDs.

As described herein, the base station 105 may assign RB allocations 305 on an integer grid, where RBs may consist of a certain number of REs (e.g., 12 REs). In some examples, the base station 105 may base a DMRS pattern, DMRS length, and a TBS on a different grid that is associated with the base number of REs, K (e.g., 64 REs).

Figure 4A:
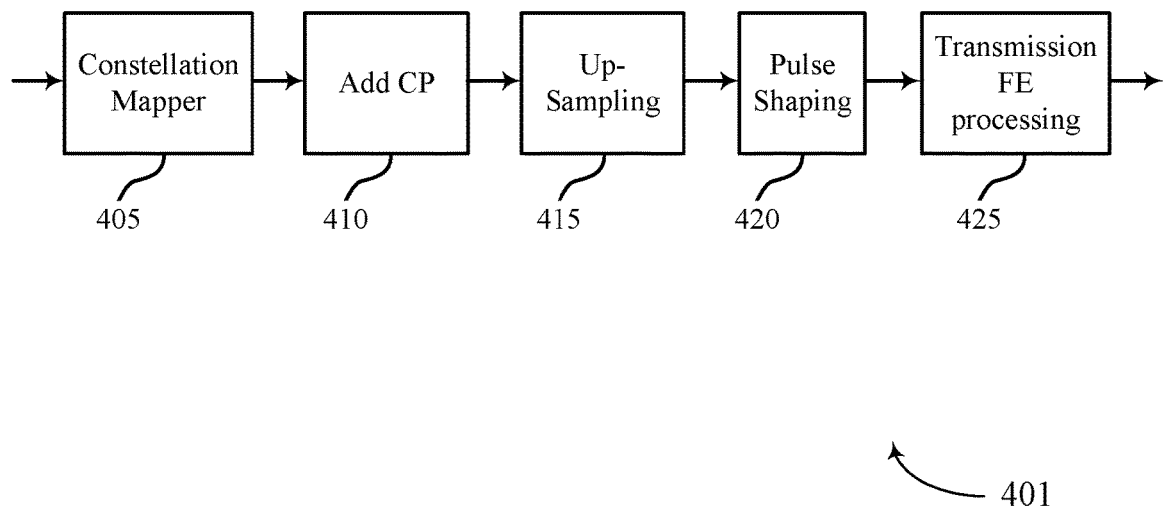
FIGS. 4A and 4B illustrate examples of signal processing flows that support flexible SC waveforms in accordance with aspects of the present disclosure.

FIG. 4A illustrates an example of a signal processing flow 401 that supports flexible SC waveforms in accordance with aspects of the present disclosure. In some examples, signal processing flow 401 may implement aspects of wireless communications systems 100 or 200 and may be implemented by a UE 115 or a base station 105, which may be examples of a UE 115 or a base station 105 described with reference to FIGS. 1-3. In some cases, the UE 115 or the base station 105 may use an SC waveform for uplink or downlink transmissions and may configure corresponding SC transmissions using signal processing flow 401.

At 405, the UE 115 or the base station 105 (e.g., a transmitting wireless device) may perform constellation mapping. In some cases, constellation mapping may include modulating bits for transmission according to a modulation scheme, which may produce symbols for transmission.

At 410, the transmitting wireless device may add a CP to each symbol for transmission. In some cases, adding a CP may include adding a CP with a different static or dynamic length, as discussed with reference to FIGS. 2, 5A, and 5B.

At 415, the transmitting wireless device may perform up-sampling on the modulated information, as discussed with reference to FIG. 2. In some cases, up-sampling may include performing an up-sampling according to a specified ratio (e.g., N/K).

At 420, the transmitting wireless device may perform pulse shaping on the modulated, up-sampled information. In some examples (e.g., based on a shape of the pulse shaping filter), the transmitting wireless device may achieve a lower PAPR and a wider bandwidth occupation. Additionally or alternatively, the pulse shaping filter may be chosen such that the transmission occupies a fraction of the system bandwidth (e.g., to allow for UE multiplexing).

At 425, the transmitting wireless device may perform transmission FE processing at a transmitter FE. In some cases, the transmission FE processing may include converting the information to be transmitted from a digital signal to an analog signal.

Figure 4B:
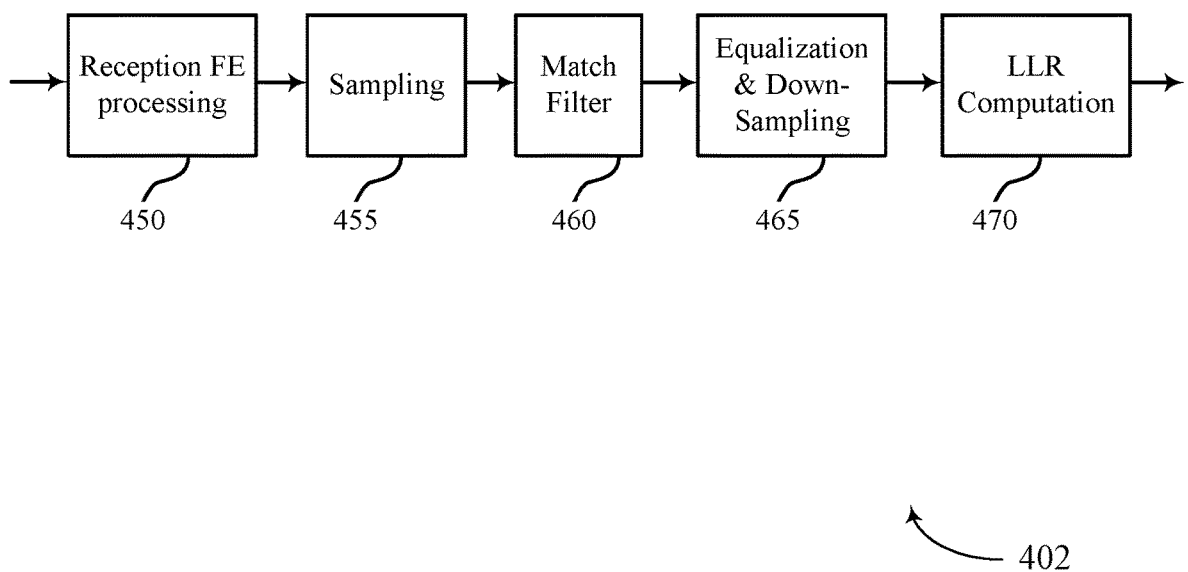

FIG. 4B illustrates an example of a signal processing flow 402 that supports flexible SC waveforms in accordance with aspects of the present disclosure. In some examples, signal processing flow 402 may implement aspects of wireless communications systems 100 or 200 and may be implemented by a UE 115 or a base station 105, which may be examples of a UE 115 or a base station 105 described with reference to FIGS. 1-3. In some cases, the UE 115 or the base station 105 may use an SC waveform for uplink or downlink transmissions and may receive corresponding SC transmissions using signal processing flow 402.

At 450, the UE 115 or the base station 105 (e.g., receiving wireless device) may perform reception FE processing on a received signal. In some cases, the processing may be performed at a receiver FE and may include performing up-conversion, down-conversion, or time domain phase-ramping at a receiver FE. Additionally, the reception FE processing may include converting the received information from an analog signal to a digital signal.

At 455, the receiving wireless device may perform sampling on the received information. In some cases, the receiving wireless device may perform down-sampling as part of the sampling process.

At 460, the receiving wireless device may match a pulse shaping filter used for transmitting the received information (e.g., in order to undo filtering operations).

At 465, the receiving wireless device may perform time domain equalization or frequency domain equalization on the received information and may also down-sample the received information (e.g., if not performed at 455).

At 470, the receiving wireless device may begin to decode the received information by performing LLR computations.

Figure 5A:
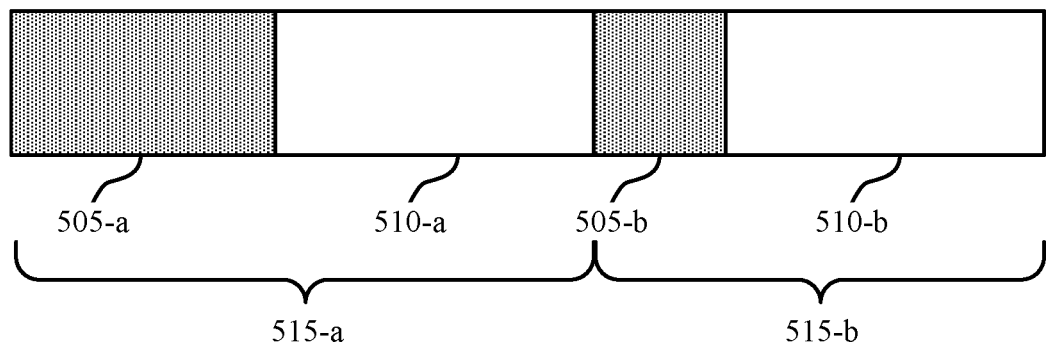
FIGS. 5A and 5B illustrate examples of cyclic prefix (CP) schemes that support flexible SC waveforms in accordance with aspects of the present disclosure.

FIG. 5A illustrates an example of a CP scheme 501 that supports flexible SC waveforms in accordance with aspects of the present disclosure. In some examples, CP scheme 501 may implement aspects of wireless communications systems 100 or 200, and may be implemented by a UE 115 and a base station 105, which may be examples of a UE 115 and a base station 105 described with reference to FIGS. 1-4. In some cases, the UE 115 and the base station 105 may use an SC waveform for uplink or downlink transmissions and may configure the SC waveform using an SC transmission configuration.

In some examples, the SC transmission configuration may include an indication (e.g., via an RRC message or a control message) of a different CP length (e.g., CP to data ratio) for all SC transmissions. In some cases, a CP based on the different CP length may remain an integer when transmitting using a multiple of a number K REs, which in some cases, may be smaller than a number K using a longer CP. Therefore, the CP length may enable the base station 105 to schedule transmission resources (e.g., uplink or downlink resources) using an integer number of RBs, where the integer number of RBs may be smaller than a number of RBs used with a longer CP, thus allowing for more flexible scheduling (e.g., due to a finer granularity of RBs).

In one example, the base station 105 may configure the UE 115 (e.g., via RRC or control signaling) to use a base CP to data ratio of 128:2048 (e.g., which may be reduced to 1:16) for uplink or downlink communications. In one example, with a 15 kHz SCS and a 20 MHz bandwidth, the base station 105 may set the ratio of samples within CP 505-a to samples within data region 510-a to be 256:2048 for a first symbol 515-a within a TTI (e.g., consisting of seven symbols). Similarly, in a second symbol 515-b within the TTI (e.g., and following symbols of the TTI), the base station 105 may set the ratio of samples within CP 505-b to samples within data region 510-b to be 128:2048. In another example, with a 30 kHz SCS and a 100 MHz bandwidth, the base station 105 may set the ratio of samples within CP 505-a to samples within data region 510-a to be 768:2048 for a first symbol 515-a within a TTI (e.g., consisting of 14 symbols). Similarly, in a second symbol 515-b within the TTI (e.g., and following symbols of the TTI), the base station 105 may set the ratio of samples within CP 505-b to samples within data region 510-b to be 256:2048. The UE 115 may use the configured CP length to process downlink communications or transmit uplink communications to the base station 105.

In some cases (e.g., with an up-sampling ratio of two), the above CP ratios may enable the minimum number of REs (e.g., K) for one transmission to be eight (e.g., in order to maintain an integer CP). After up-sampling by a factor of two, these CP ratios may create a CP to data ratio of 1:16 for symbols after a first symbol in a TTI and a CP to data ratio of X:16 for the first symbol in the TTI, where X may be greater than one. In one example, an RB may contain 12 REs, and two RBs may therefore correspond to three sets of eight REs (e.g., three sets of K REs). Therefore, resource scheduling may be performed at a finer granularity (e.g., two RBs) while maintaining an integer number of occupied RBs within the scheduled resources.

In some cases of using a different configured CP length, the CP length may be reduced by a certain factor (e.g., 11%, or (144−128)/144, in the above example) when compared to other CP lengths. For example, a CP in a 15 kHz SCS may be reduced from 4.69 µs to 4.17 µs, a CP in a 960 kHz SCS may be reduced from 73 nanoseconds (ns) to 37 ns, and a CP in a 1.92 MHz SCS may be reduced from 65 ns to 32 ns. In some examples, the base station 105 may apply the different configured CP length to different waveforms, such as OFDM, SC-FDM, SC-QAM, etc.

Figure 5B:
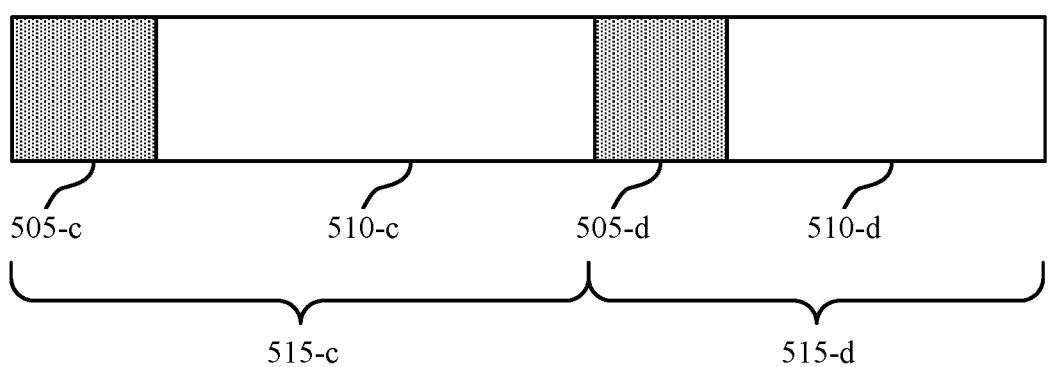

FIG. 5B illustrates an example of a CP scheme 502 that supports flexible SC waveforms in accordance with aspects of the present disclosure. In some examples, CP scheme 502 may implement aspects of wireless communications systems 100 or 200, and may be implemented by a UE 115 and a base station 105, which may be examples of a UE 115 and a base station 105 described with reference to FIGS. 1-4. In some cases, the UE 115 and the base station 105 may use an SC waveform for uplink or downlink transmissions and may configure the SC waveform using an SC transmission configuration.

In some examples, the SC transmission configuration may include an indication (e.g., via an RRC message or a control message) of a CP length (e.g., CP to data ratio) that may change for different SC transmissions (e.g., may be different for different bandwidths). In some examples, the CP samples for a TTI may be split uniformly across the symbols within the TTI (e.g., 0.5 ms), while folding a remainder of the samples into a first symbol of the TTI. In some cases, a CP based on the different CP length may remain an integer when transmitting using a multiple of a number K REs, which in some cases, may be smaller than a number K using a longer CP. Therefore, the CP length may enable the base station 105 to schedule transmission resources (e.g., uplink or downlink resources) using an integer number of RBs, where the integer number of RBs may be smaller than a number of RBs used with a longer CP, thus allowing for more flexible scheduling (e.g., due to a finer granularity of RBs).

In one example, with a 15 kHz SCS and a 100 RB assignment (e.g., 18 MHz assigned bandwidth), the base station 105 may set the ratio of samples within CP 505-c to samples within data region 510-c to be 90:1200 for a first symbol 515-c within a TTI (e.g., consisting of seven symbols). Similarly, in a second symbol 515-d within the TTI (e.g., and following symbols of the TTI), the base station 105 may set the ratio of samples within CP 505-d to samples within data region 510-d to be 85:1200. In another example, with a 15 kHz SCS and a 50 RB assignment (e.g., 9 MHz assigned bandwidth), the base station 105 may set the ratio of samples within CP 505-c to samples within data region 510-c to be 48:600 for a first symbol 515-c within a TTI (e.g., consisting of seven symbols). Similarly, in a second symbol 515-d within the TTI (e.g., and following symbols of the TTI), the base station 105 may set the ratio of samples within CP 505-d to samples within data region 510-d to be 42:600. The UE 115 may use the configured CP length to process downlink communications or transmit uplink communications to the base station 105.

In some cases, the above CP ratios may enable resource scheduling to be performed at a finer granularity while maintaining an integer number of occupied RBs within the scheduled resources. Additionally, using similar CP lengths for the first and following symbols of a TTI may increase the utility of a CP, which in some cases, may be limited by the smallest CP in the TTI. In some cases, the CP length may be automatic (e.g., automatically determined by the base station 105) based on a number of assigned RBs or may be calculated by a UE 115 after receiving a control message (e.g., DCI) indicating a number of RBs for downlink or uplink communications.

A base station 105 may enable dynamic CP ratios in some cases where an assignment bandwidth is known or predefined. For example, a UE 115 may be preconfigured to operate using an RB bandwidth (e.g., 100 RBs, 50 RBs, etc.), and may receive an indication or perform calculations to identify a CP length for uplink or downlink communications. Additionally or alternatively, the UE 115 may receive a grant (e.g., via a control message such as a DCI) that is based on a preconfigured or preassigned bandwidth relating to a data channel assignment that may be more flexible in terms of bandwidth (e.g., provided that the time between receiving the grant and transmitting or receiving on the data channel is large enough for the UE 115 to decode the grant and process the data according to a dynamic CP ratio). Further, if multiple UEs 115 are FDMed in the same TTI, a base station 105 may maintain the same CP across the UEs 115 in order to facilitate frequency domain processing and may schedule the UEs 115 with the same bandwidth operation.

Figure 6:
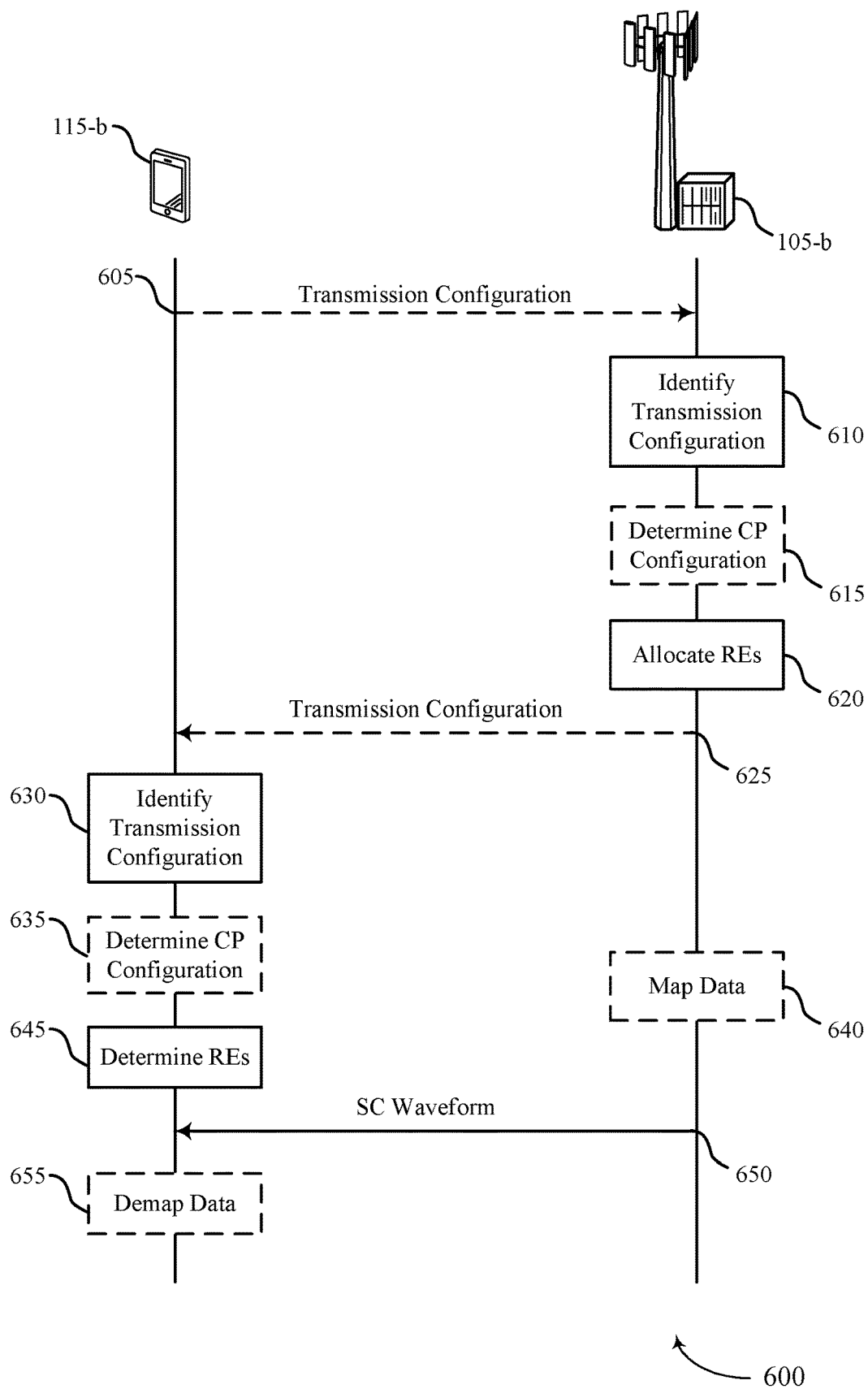
FIG. 6 illustrates an example of a process flow that supports flexible SC waveforms in accordance with aspects of the present disclosure.

FIG. 6 illustrates an example of a process flow 600 that supports flexible SC waveforms in accordance with aspects of the present disclosure. In some examples, process flow 600 may implement aspects of wireless communications systems 100 or 200 and may include a UE 115-b and a base station 105-b, which may be examples of a UE 115 and base station 105 described with reference to FIGS. 1-5. Process flow 600 may also implement aspects of RB scheme 300, signal processing flow 401, signal processing flow 402, CP scheme 501, or CP scheme 502. In some cases, UE 115-b and base station 105-b may use an SC waveform for uplink or downlink transmissions and may configure the SC waveform using an SC transmission configuration.

In the following description of the process flow 600, the communications between UE 115-b and base station 105-b may be transmitted in a different order than the order shown, or the operations performed by base station 105-b and UE 115-b may be performed in different orders or at different times. Certain operations may also be left out of the process flow 600, or other operations may be added to the process flow 600. It is to be understood that while base station 105-b and UE 115-b are shown performing a number of the operations of process flow 600, any wireless device may perform the operations shown. For example, base station 105-b may represent any wireless transmitting device and UE 115-b may represent any wireless receiving device. As such, the processes shown being performed by UE 115-b may, in some cases, be performed by base station 105-b and the processes shown performed by base station 105-b may, in some cases, be performed by UE 115-b.

At 605, UE 115-b may, in some cases, transmit a message to a transmitting device (e.g., base station 105-b), the message indicating a transmission configuration for the SC waveform based on an REID included in the message. In some cases, the REID may be based on a cell ID of a cell for communications between the transmitting device and the receiving device. In some cases, UE 115-b may transmit an indication of the mapping configuration in the message to the transmitting device, where the message may include the transmission configuration.

At 610, base station 105-b may identify the transmission configuration for an SC waveform, where the transmission configuration may indicate a set of RBs allocated for communications with a receiving device (e.g., UE 115-b). Additionally or alternatively, base station 105-b may identify a transmission configuration for the SC waveform, the transmission configuration indicating a set of RBs allocated for communications with a receiving device and a CP ratio for a CP of the SC waveform. In some cases, identifying the transmission configuration may include determining a DMRS pattern, a DMRS length, or a TBS associated with the SC waveform based on the set of REs or the number of the set of REs.

At 615, base station 105-b may determine a CP configuration for the SC waveform based on the transmission configuration, where the CP configuration may indicate a first CP ratio for an initial symbol of the SC waveform (e.g., initial symbol within a TTI) and a second CP ratio different from the first CP ratio for one or more symbols after the initial symbol of the SC waveform (e.g., within the same TTI). In some examples, base station 105-b may generate a first CP for the initial symbol (e.g., of the TTI) based on the first CP ratio and generate at least one additional CP for the one or more symbols after the initial symbol (e.g., within the same TTI) based on the second CP ratio, where the second CP ratio may be less than the first CP ratio.

In some cases, base station 105-b may determine the first CP ratio and the second CP ratio based on an SCS associated with the SC waveform. For example, a number of samples for the first CP and a number of samples for the at least one additional CP may be based on the SCS. In some cases, base station 105-b may determine the first CP ratio and the second CP ratio based on a bandwidth part (BWP) associated with the SC waveform. For example, a number of samples for the first CP and a number of samples for the at least one additional CP may be based on a number of the set of RBs of the BWP.

At 620, base station 105-b may allocate a set of REs of the set of RBs for the SC waveform based on the transmission configuration, where a number of the set of REs may be less than a total number of REs of the set of RBs. Additionally or alternatively, base station 105-b may allocate a set of REs of the set of RBs for the SC waveform that includes the CP based on the transmission configuration and the CP ratio.

At 625, base station 105-b may, in some cases, transmit an indication of the transmission configuration to the receiving device via RRC signaling or DCI. In some cases, base station 105-b may transmit an indication of the mapping configuration in the message to the receiving device, where the message may include the transmission configuration.

At 630, UE 115-b may identify the transmission configuration for the SC waveform, where the transmission configuration may indicate a set of RBs allocated for communications with the transmitting device. Additionally or alternatively, UE 115-b may identify a transmission configuration for the SC waveform, the transmission configuration indicating a set of RBs allocated for communications with the transmitting device and a CP ratio for a CP of the SC waveform. In some cases, UE 115-b may identify the transmission configuration before 505 (e.g., in order to transmit a message indicating the transmission configuration). In some cases, identifying the transmission configuration may include determining a DMRS pattern, a DMRS length, or a TBS associated with the SC waveform based on the set of REs or the number of the set of REs.

At 635, UE 115-b may determine a CP configuration for the SC waveform based on the transmission configuration, where the CP configuration may indicate a first CP ratio for an initial symbol of the SC waveform (e.g., initial symbol within a TTI) and a second CP ratio different from the first CP ratio for one or more symbols after the initial symbol of the SC waveform (e.g., within the same TTI). In some examples, UE 115-b may identify a first CP for the initial symbol (e.g., of the TTI) based on the first CP ratio and identify at least one additional CP for the one or more symbols after the initial symbol (e.g., within the same TTI) based on the second CP ratio, where the second CP ratio may be less than the first CP ratio.

In some cases, UE 115-b may determine the first CP ratio and the second CP ratio based on an SCS associated with the SC waveform. For example, a number of samples for the first CP and a number of samples for the at least one additional CP may be based on the SCS. In some cases, UE 115-b may determine the first CP ratio and the second CP ratio based on a BWP associated with the SC waveform. For example, a number of samples for the first CP and a number of samples for the at least one additional CP may be based on a number of the set of RBs of the BWP.

At 640, base station 105-b may identify a mapping configuration for mapping data associated with the SC waveform to the set of REs based on the transmission configuration, and may map the data associated with the SC waveform to the set of REs according to the mapping configuration. In some examples, mapping the data may include mapping data beginning at a first RE (e.g., RE located at a bottom edge of the RB bandwidth), a middle RE, or a last RE (e.g., RE located at a top edge of the RB bandwidth) of the set of REs based on the mapping configuration and respective locations of each RE of the set of REs. In some cases, the data may be mapped such that at least one RE of the set of REs is unoccupied.

At 645, UE 115-b may determine a set of REs of the set of RBs for the SC waveform based on the transmission configuration, where a number of the set of REs may be less than a total number of REs of the set of RBs. Additionally or alternatively, UE 115-b may determine a set of REs of the set of RBs for the SC waveform that includes the CP based on the transmission configuration and the CP ratio.

At 650, base station 105-b may transmit the SC waveform to the receiving device via the set of REs. Additionally or alternatively, base station 105-b may transmit the SC waveform including the CP to the receiving device via the set of REs in accordance with the CP ratio. In some cases, transmitting the SC waveform may include transmitting the SC waveform including the first CP and the at least one additional CP to the receiving device.

At 655, UE 115-b may identify a mapping configuration for data of the SC waveform mapped to the set of REs based on the transmission configuration and may demap the data of the SC waveform. In some cases, UE 115-b may demap the data beginning at a first RE, a middle RE, or a last RE of the set of REs based on the mapping configuration and respective locations of each RE of the set of REs.

Figure 7:
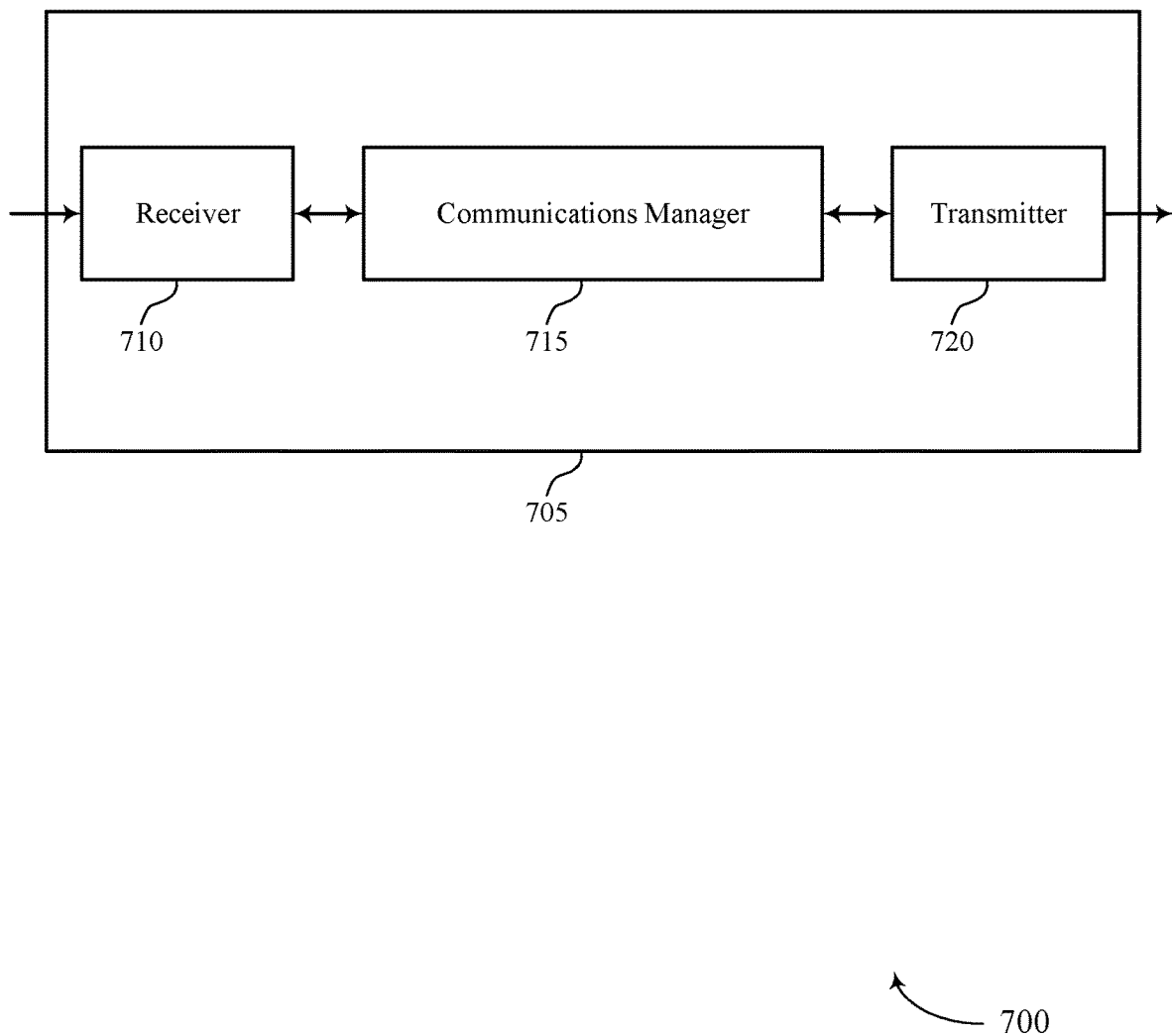
FIGS. 7 and 8 show block diagrams of devices that support flexible SC waveforms in accordance with aspects of the present disclosure.

FIG. 7 shows a block diagram 700 of a device 705 that supports flexible SC waveforms in accordance with aspects of the present disclosure. The device 705 may be an example of aspects of a UE 115 or base station 105 as described herein. The device 705 may include a receiver 710, a communications manager 715, and a transmitter 720. The device 705 may also include a processor. Each of these components may be in communication with one another (e.g., via one or more buses).

Receiver 710 may receive information such as packets, user data, or control information associated with various information channels (e.g., control channels, data channels, and information related to flexible SC waveform, etc.). Information may be passed on to other components of the device 705. The receiver 710 may be an example of aspects of the transceiver 1020 or 1120 as described with reference to FIGS. 10 and 11. The receiver 710 may utilize a single antenna or a set of antennas.

The communications manager 715 may identify a transmission configuration for an SC waveform, the transmission configuration indicating a set of RBs allocated for communications with a receiving device, allocate a set of REs of the set of RBs for the SC waveform based on the transmission configuration, where a number of the set of REs is less than a total number of REs of the set of RBs, and transmit the SC waveform to the receiving device via the set of REs. The communications manager 715 may identify a transmission configuration for an SC waveform, the transmission configuration indicating a set of RBs allocated for communications with a receiving device and a CP ratio for a CP of the SC waveform, allocate a set of REs of the set of RBs for the SC waveform that includes the CP based on the transmission configuration and the CP ratio, and transmit the SC waveform including the CP to the receiving device via the set of REs in accordance with the CP ratio.

The communications manager 715 may also identify a transmission configuration for an SC waveform, the transmission configuration indicating a set of RBs allocated for communications with a transmitting device, determine a set of REs of the set of RBs for the SC waveform based on the transmission configuration, where a number of the set of REs is less than a total number of REs of the set of RBs, and receive the SC waveform from the transmitting device via the set of REs. The communications manager 715 may also identify a transmission configuration for an SC waveform, the transmission configuration indicating a set of RBs allocated for communications with a transmitting device and a CP ratio for a CP of the SC waveform, determine a set of REs of the set of RBs for the SC waveform that includes the CP based on the transmission configuration and the CP ratio, and receive the SC waveform including the CP from the transmitting device via the set of REs in accordance with the CP ratio. The communications manager 715 may be an example of aspects of the communications manager 1010 or 1110 as described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communications manager 715 may be implemented as an integrated circuit or chipset for a mobile device modem, and the receiver 710 and transmitter 720 may be implemented as analog components (e.g., amplifiers, filters, antennas) coupled with the mobile device modem to enable wireless transmission and reception over one or more bands.

The actions performed by the communications manager 715 as described herein may be implemented to realize one or more potential advantages. One implementation may allow a UE 115 to save power and increase battery life by implementing an SC receiver (e.g., in the time domain) to receive downlink communications (e.g., from a base station 105). Additionally or alternatively, the UE 115 may further implement an SC transmitter to transmit uplink communications (e.g., to a base station 105), which may result in a lower PAPR for the uplink communications, as well as further power savings and increased battery life. Another implementation may provide improved quality and reliability of service at the UE 115 by reducing complexity of implementing an SC receiver or transmitter, which may also reduce latency.

Transmitter 720 may transmit signals generated by other components of the device 705. In some examples, the transmitter 720 may be collocated with a receiver 710 in a transceiver module. For example, the transmitter 720 may be an example of aspects of the transceiver 1020 or 1120 as described with reference to FIGS. 10 and 11. The transmitter 720 may utilize a single antenna or a set of antennas. In some examples, the communications manager 715 may be implemented as an integrated circuit or chipset for a mobile device modem, and the receiver 710 and transmitter 720 may be implemented as analog components (e.g., amplifiers, filters, antennas, etc.) coupled with the mobile device modem to enable wireless transmission and reception over one or more bands.

Figure 8:
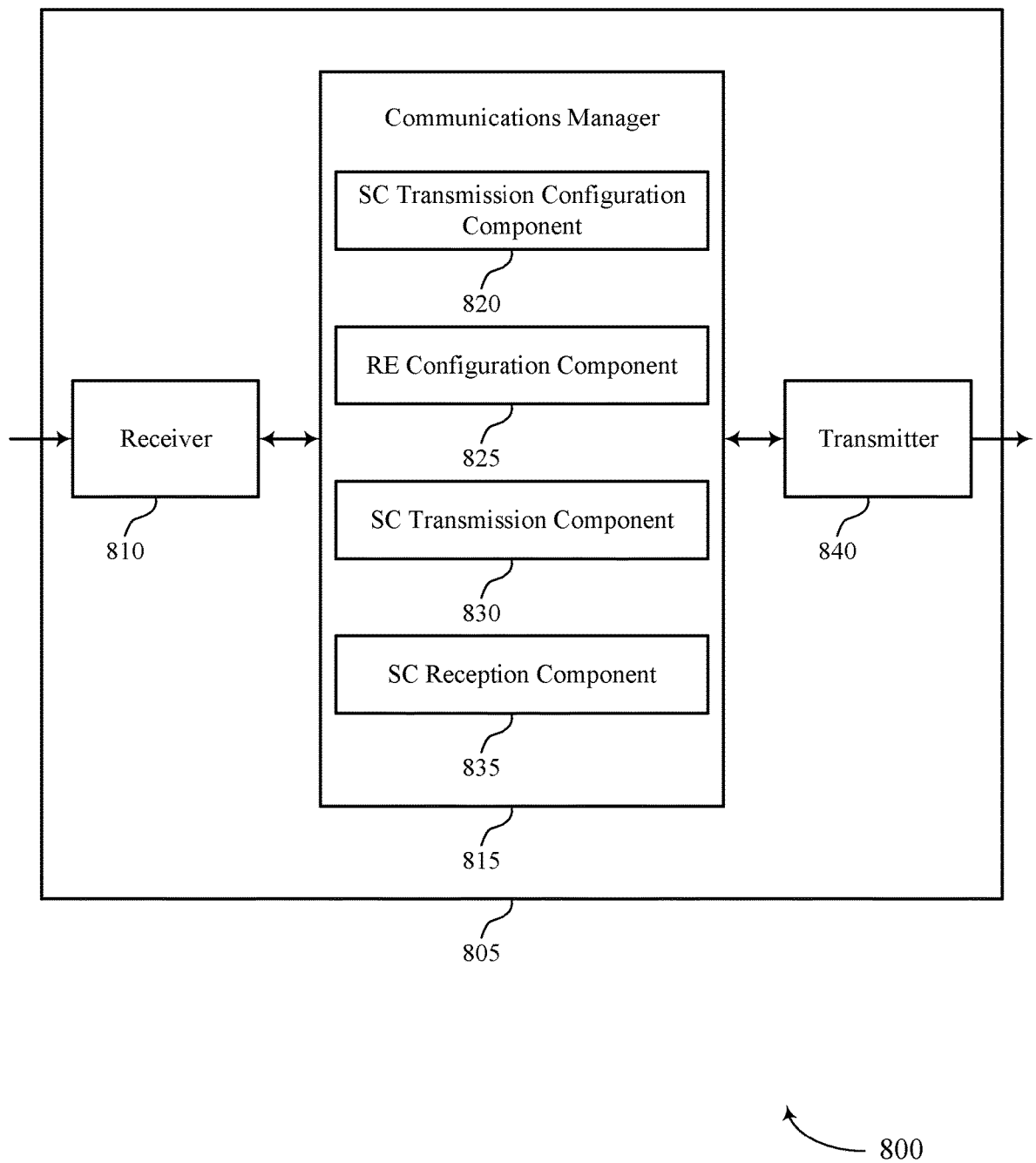

FIG. 8 shows a block diagram 800 of a device 805 that supports flexible SC waveforms in accordance with aspects of the present disclosure. The device 805 may be an example of aspects of a device 705, a UE 115, or a base station 105 as described herein. The device 805 may include a receiver 810, a communications manager 815, and a transmitter 840. The device 805 may also include a processor. Each of these components may be in communication with one another (e.g., via one or more buses).

Receiver 810 may receive information such as packets, user data, or control information associated with various information channels (e.g., control channels, data channels, and information related to flexible SC waveform, etc.). Information may be passed on to other components of the device 805. The receiver 810 may be an example of aspects of the transceiver 1020 or 1120 as described with reference to FIGS. 10 and 11. The receiver 810 may utilize a single antenna or a set of antennas.

The communications manager 815 may be an example of aspects of the communications manager 715 as described herein. The communications manager 815 may include an SC transmission configuration component 820, an RE configuration component 825, an SC transmission component 830, and an SC reception component 835. The communications manager 815 may be an example of aspects of the communications manager 1010 or 1110 as described herein.

The SC transmission configuration component 820 may identify a transmission configuration for an SC waveform, the transmission configuration indicating a set of RBs allocated for communications with a receiving device or a transmitting device. The SC transmission configuration component 820 may identify a transmission configuration for an SC waveform, the transmission configuration indicating a set of RBs allocated for communications with a receiving device or a transmitting device and a CP ratio for a CP of the SC waveform.

The RE configuration component 825 may allocate a set of REs of the set of RBs for the SC waveform based on the transmission configuration, where a number of the set of REs is less than a total number of REs of the set of RBs. The RE configuration component 825 may allocate a set of REs of the set of RBs for the SC waveform that includes the CP based on the transmission configuration and the CP ratio. The RE configuration component 825 may determine a set of REs of the set of RBs for the SC waveform based on the transmission configuration, where a number of the set of REs is less than a total number of REs of the set of RBs. The RE configuration component 825 may determine a set of REs of the set of RBs for the SC waveform that includes the CP based on the transmission configuration and the CP ratio.

The SC transmission component 830 may transmit the SC waveform to the receiving device via the set of REs. The SC transmission component 830 may transmit the SC waveform including the CP to the receiving device via the set of REs in accordance with the CP ratio. The SC reception component 835 may receive the SC waveform from the transmitting device via the set of REs. The SC reception component 835 may receive the SC waveform including the CP from the transmitting device via the set of REs in accordance with the CP ratio.

Transmitter 840 may transmit signals generated by other components of the device 805. In some examples, the transmitter 840 may be collocated with a receiver 810 in a transceiver module. For example, the transmitter 840 may be an example of aspects of the transceiver 1020 or 1120 as described with reference to FIGS. 10 and 11. The transmitter 840 may utilize a single antenna or a set of antennas.

In some examples, communications manager 815 may be implemented as an integrated circuit or chipset for a mobile device modem, and the receiver 810 and transmitter 820 may be implemented as analog components (e.g., amplifiers, filters, antennas, etc.) coupled with the mobile device modem to enable wireless transmission and reception.

Based on implementing an SC receiver and/or SC transmitter, a processor of a UE 115 (e.g., controlling the receiver 710, the transmitter 740, or the SC transmission component 920 as described with reference to FIG. 9) may reduce complexity and efficiently receive downlink SC communications and transmit uplink SC communications (e.g., via the SC transmission configuration component 820 or the RE configuration component 825). Further, the processor of UE 115 may receive an indication of an SC configuration to implement at the SC receiver or SC transmitter. The processor of the UE 115 may use the SC configuration to control the SC receiver or SC transmitter within the UE 115 for communicating SC waveforms.

Figure 9:
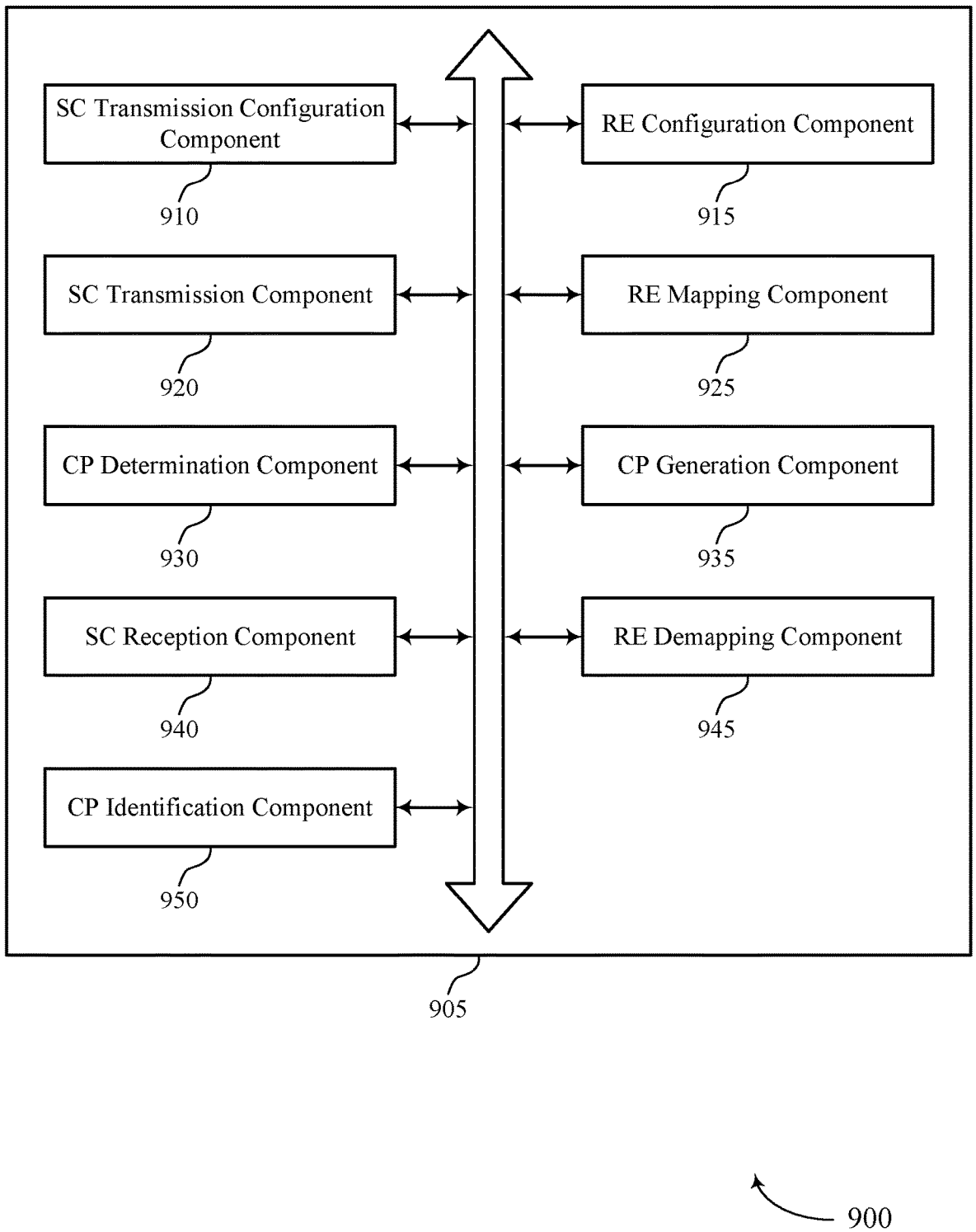
FIG. 9 shows a block diagram of a communications manager that supports flexible SC waveforms in accordance with aspects of the present disclosure.

FIG. 9 shows a block diagram 900 of a communications manager 905 that supports flexible SC waveforms in accordance with aspects of the present disclosure. The communications manager 905 may be an example of aspects of a communications manager 715, a communications manager 815, or a communications manager 1010 described herein. The communications manager 905 may include an SC transmission configuration component 910, an RE configuration component 915, an SC transmission component 920, an RE mapping component 925, a CP determination component 930, a CP generation component 935, an SC reception component 940, an RE demapping component 945, and a CP identification component 950. Each of these modules may communicate, directly or indirectly, with one another (e.g., via one or more buses).

The SC transmission configuration component 910 may identify a transmission configuration for an SC waveform, the transmission configuration indicating a set of RBs allocated for communications with a receiving device. In some examples, the SC transmission configuration component 910 may identify a transmission configuration for an SC waveform, the transmission configuration indicating a set of RBs allocated for communications with a receiving device and a CP ratio for a CP of the SC waveform. In some examples, the SC transmission configuration component 910 may identify a transmission configuration for an SC waveform, the transmission configuration indicating a set of RBs allocated for communications with a transmitting device. In some examples, the SC transmission configuration component 910 may identify a transmission configuration for an SC waveform, the transmission configuration indicating a set of RBs allocated for communications with a transmitting device and a CP ratio for a CP of the SC waveform.

In some examples, the SC transmission configuration component 910 may receive an indication of the mapping configuration in a message from the receiving device, the message including the transmission configuration. In some examples, the SC transmission configuration component 910 may transmit an indication of the transmission configuration to the receiving device via RRC signaling or DCI. In some examples, the SC transmission configuration component 910 may receive a message from the receiving device, the message indicating the transmission configuration for the SC waveform based on a REID included in the message. In some examples, the SC transmission configuration component 910 may determine a DMRS pattern, a DMRS length, or a TBS associated with the SC waveform based on the set of REs or the number of the set of REs.

In some examples, the SC transmission configuration component 910 may receive an indication of the mapping configuration in a message from the transmitting device, the message including the transmission configuration. In some examples, the SC transmission configuration component 910 may receive an indication of the transmission configuration from the transmitting device via RRC signaling or DCI. In some examples, the SC transmission configuration component 910 may transmit a message to the transmitting device, the message indicating the transmission configuration for the SC waveform based on a REID included in the message. In some cases, the REID is based on a cell ID of a cell for communications between the transmitting device and the receiving device. In some examples, the SC transmission configuration component 910 may determine a DMRS pattern, a DMRS length, or a TBS associated with the SC waveform based on the set of REs or the number of the set of REs.

The RE configuration component 915 may allocate a set of REs of the set of RBs for the SC waveform based on the transmission configuration, where a number of the set of REs is less than a total number of REs of the set of RBs. In some examples, the RE configuration component 915 may allocate a set of REs of the set of RBs for the SC waveform that includes the CP based on the transmission configuration and the CP ratio. In some examples, the RE configuration component 915 may determine a set of REs of the set of RBs for the SC waveform based on the transmission configuration, where a number of the set of REs is less than a total number of REs of the set of RBs. In some examples, the RE configuration component 915 may determine a set of REs of the set of RBs for the SC waveform that includes the CP based on the transmission configuration and the CP ratio.

The SC transmission component 920 may transmit the SC waveform to the receiving device via the set of REs. In some examples, the SC transmission component 920 may transmit the SC waveform including the CP to the receiving device via the set of REs in accordance with the CP ratio. In some examples, the SC transmission component 920 may transmit the SC waveform including the first CP and the at least one additional CP to the receiving device.

The RE mapping component 925 may identify a mapping configuration for mapping data associated with the SC waveform to the set of REs based on the transmission configuration. In some examples, the RE mapping component 925 may map the data associated with the SC waveform to the set of REs according to the mapping configuration. In some examples, the RE mapping component 925 may map data beginning at a first RE, a middle RE, or a last RE of the set of REs based on the mapping configuration and respective locations of each RE of the set of REs. In some cases, the data is mapped such that at least one RE of the set of REs is unoccupied.

The CP determination component 930 may determine a CP configuration for the SC waveform based on the transmission configuration, where the CP configuration indicates a first CP ratio for an initial symbol of the SC waveform and a second CP ratio different from the first CP ratio for one or more symbols after the initial symbol of the SC waveform. In some examples, the CP determination component 930 may determine the first CP ratio and the second CP ratio based on an SCS associated with the SC waveform. In some examples, the CP determination component 930 may determine the first CP ratio and the second CP ratio based on a BWP associated with the SC waveform. In some cases, a number of samples for the first CP and a number of samples for the at least one additional CP are based on the SCS. In some cases, a number of samples for the first CP and a number of samples for the at least one additional CP are based on a number of the set of RBs of the BWP.

The CP generation component 935 may generate a first CP for the initial symbol based on the first CP ratio. In some examples, the CP generation component 935 may generate at least one additional CP for the one or more symbols after the initial symbol based on the second CP ratio, where the second CP ratio is less than the first CP ratio.

The SC reception component 940 may receive the SC waveform from the transmitting device via the set of REs. In some examples the SC reception component 940 may receive the SC waveform including the CP from the transmitting device via the set of REs in accordance with the CP ratio. In some examples, the SC reception component 940 may receive the SC waveform including the first CP and the at least one additional CP from the transmitting device.

The RE demapping component 945 may identify a mapping configuration for data of the SC waveform mapped to the set of REs based on the transmission configuration. In some examples, the RE demapping component 945 may demap the data of the SC waveform. In some examples, the RE demapping component 945 may demap the data beginning at a first RE, a middle RE, or a last RE of the set of REs based on the mapping configuration and respective locations of each RE of the set of REs.

The CP identification component 950 may identify a first CP for the initial symbol based on the first CP ratio. In some examples, the CP identification component 950 may identify at least one additional CP for the one or more symbols after the initial symbol based on the second CP ratio, where the second CP ratio is less than the first CP ratio.

Figure 10:
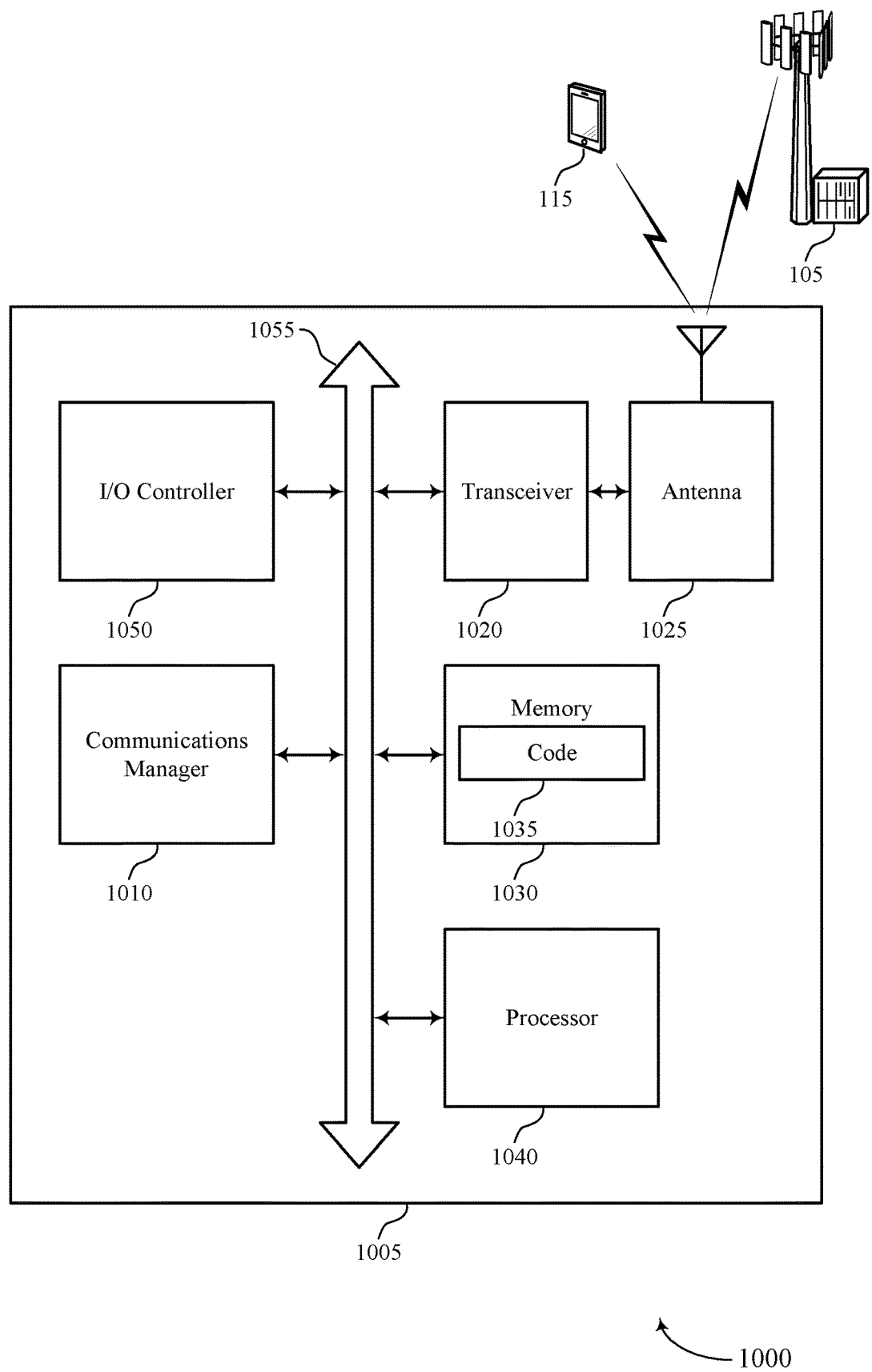
FIG. 10 shows a diagram of a system including a user equipment (UE) that supports flexible SC waveforms in accordance with aspects of the present disclosure.

FIG. 10 shows a diagram of a system 1000 including a device 1005 that supports flexible SC waveforms in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, a transceiver 1020, an antenna 1025, memory 1030, a processor 1040, and an I/O controller 1050. These components may be in electronic communication via one or more buses (e.g., bus 1055).

The communications manager 1010 may identify a transmission configuration for an SC waveform, the transmission configuration indicating a set of RBs allocated for communications with a receiving device, allocate a set of REs of the set of RBs for the SC waveform based on the transmission configuration, where a number of the set of REs is less than a total number of REs of the set of RBs, and transmit the SC waveform to the receiving device via the set of REs. The communications manager 1010 may identify a transmission configuration for an SC waveform, the transmission configuration indicating a set of RBs allocated for communications with a receiving device and a CP ratio for a CP of the SC waveform, allocate a set of REs of the set of RBs for the SC waveform that includes the CP based on the transmission configuration and the CP ratio, and transmit the SC waveform including the CP to the receiving device via the set of REs in accordance with the CP ratio.

The communications manager 1010 may also identify a transmission configuration for an SC waveform, the transmission configuration indicating a set of RBs allocated for communications with a transmitting device, determine a set of REs of the set of RBs for the SC waveform based on the transmission configuration, where a number of the set of REs is less than a total number of REs of the set of RBs, and receive the SC waveform from the transmitting device via the set of REs. The communications manager 1010 may also identify a transmission configuration for an SC waveform, the transmission configuration indicating a set of RBs allocated for communications with a transmitting device and a CP ratio for a CP of the SC waveform, determine a set of REs of the set of RBs for the SC waveform that includes the CP based on the transmission configuration and the CP ratio, and receive the SC waveform including the CP from the transmitting device via the set of REs in accordance with the CP ratio.

Transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the device 1005 may include a single antenna 1025, or the device 1005 may have more than one antenna 1025, which may be capable of concurrently transmitting or receiving multiple wireless transmissions.

The memory 1030 may include random access memory (RAM), read only memory (ROM), or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting flexible SC waveform).

The I/O controller 1050 may manage input and output signals for the device 1005. The I/O controller 1050 may also manage peripherals not integrated into the device 1005. In some cases, the I/O controller 1050 may represent a physical connection or port to an external peripheral. In some cases, the I/O controller 1050 may utilize an operating system such as iOS®, ANDROID®, MS-DOS®, MS-WINDOWS®, OS/2®, UNIX®, LINUX®, or another known operating system. In other cases, the I/O controller 1050 may represent or interact with a modem, a keyboard, a mouse, a touchscreen, or a similar device. In some cases, the I/O controller 1050 may be implemented as part of a processor. In some cases, a user may interact with the device 1005 via the I/O controller 1050 or via hardware components controlled by the I/O controller 1050.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
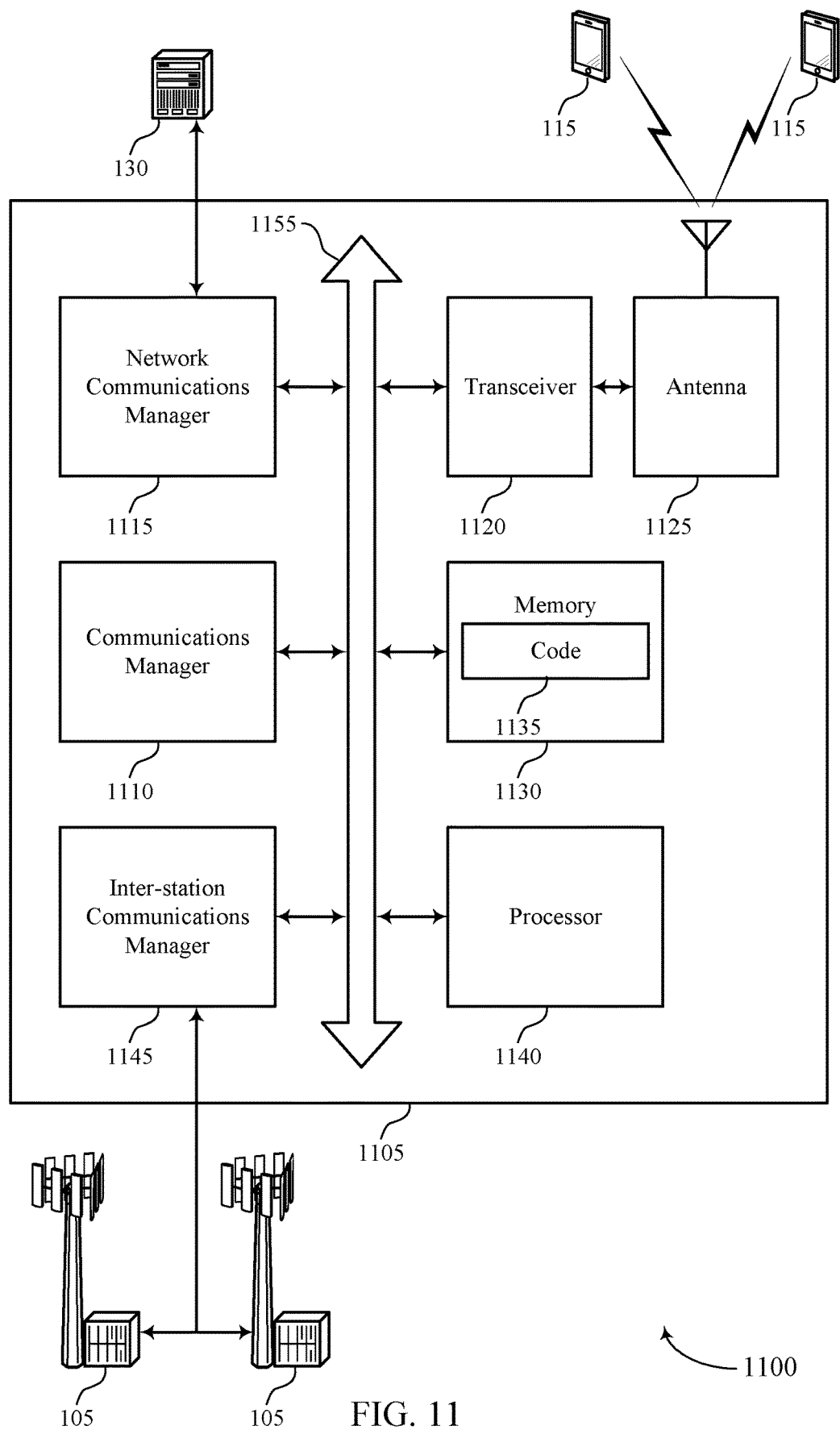
FIG. 11 shows a diagram of a system including a base station that supports flexible SC waveforms in accordance with aspects of the present disclosure.

FIG. 11 shows a diagram of a system 1100 including a device 1105 that supports flexible SC waveforms in accordance with aspects of the present disclosure. The device 1105 may be an example of or include the components of device 705, device 805, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1155).

The communications manager 1110 may identify a transmission configuration for an SC waveform, the transmission configuration indicating a set of RBs allocated for communications with a receiving device, allocate a set of REs of the set of RBs for the SC waveform based on the transmission configuration, where a number of the set of REs is less than a total number of REs of the set of RBs, and transmit the SC waveform to the receiving device via the set of REs. The communications manager 1110 may identify a transmission configuration for an SC waveform, the transmission configuration indicating a set of RBs allocated for communications with a receiving device and a CP ratio for a CP of the SC waveform, allocate a set of REs of the set of RBs for the SC waveform that includes the CP based on the transmission configuration and the CP ratio, and transmit the SC waveform including the CP to the receiving device via the set of REs in accordance with the CP ratio.

The communications manager 1110 may also identify a transmission configuration for an SC waveform, the transmission configuration indicating a set of RBs allocated for communications with a transmitting device, determine a set of REs of the set of RBs for the SC waveform based on the transmission configuration, where a number of the set of REs is less than a total number of REs of the set of RBs, and receive the SC waveform from the transmitting device via the set of REs. The communications manager 1110 may also identify a transmission configuration for an SC waveform, the transmission configuration indicating a set of RBs allocated for communications with a transmitting device and a CP ratio for a CP of the SC waveform, determine a set of REs of the set of RBs for the SC waveform that includes the CP based on the transmission configuration and the CP ratio, and receive the SC waveform including the CP from the transmitting device via the set of REs in accordance with the CP ratio.

Network communications manager 1115 may manage communications with the core network (e.g., via one or more wired backhaul links). For example, the network communications manager 1115 may manage the transfer of data communications for client devices, such as one or more UEs 115.

Transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the device 1105 may include a single antenna 1125, or the device 1105 may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting flexible SC waveform).

Inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
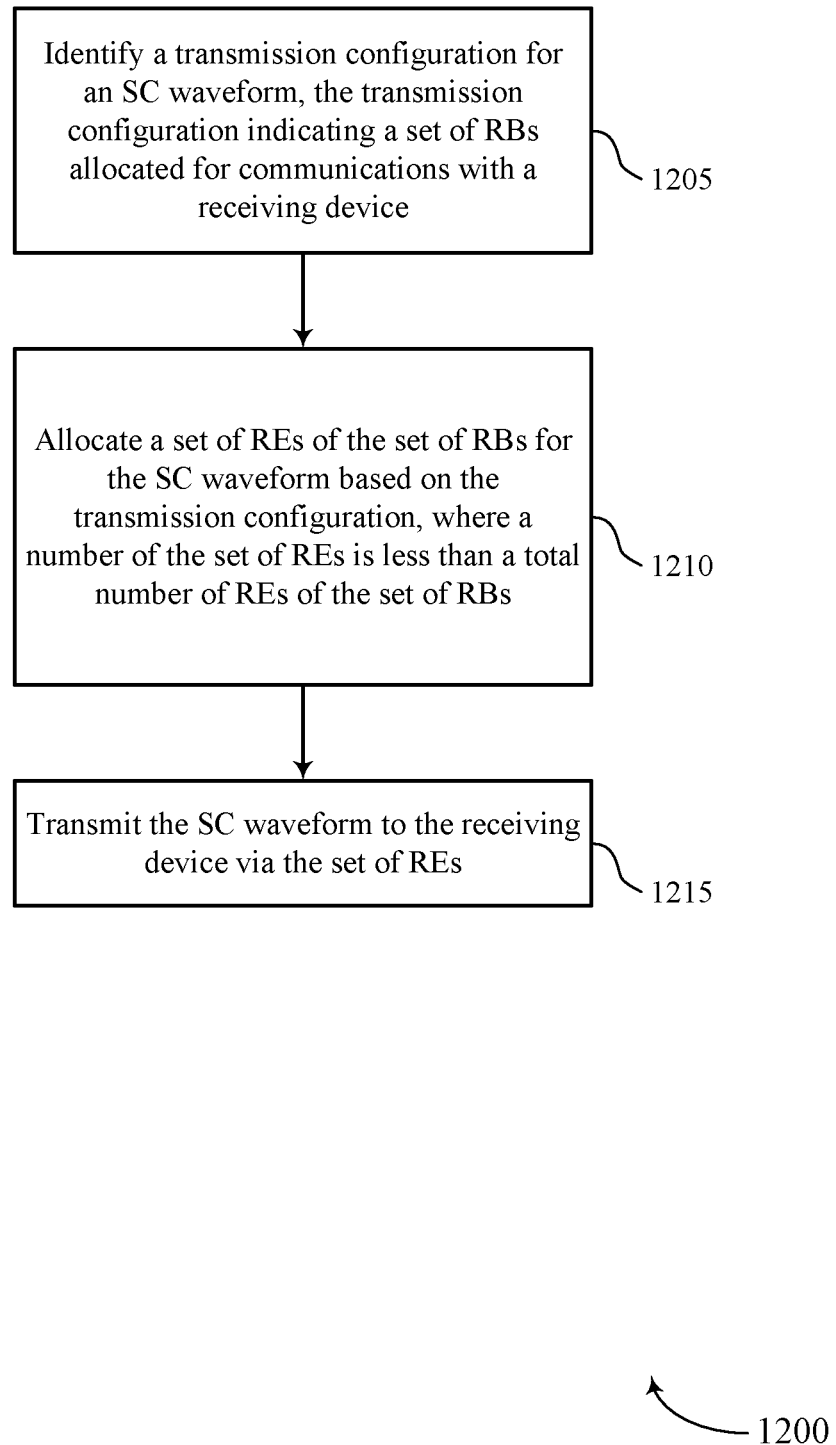
FIGS. 12 through 19 show flowcharts illustrating methods that support flexible SC waveforms in accordance with aspects of the present disclosure.

FIG. 12 shows a flowchart illustrating a method 1200 that supports flexible SC waveforms in accordance with aspects of the present disclosure. The operations of method 1200 may be implemented by a UE 115 or base station 105 or its components as described herein. For example, the operations of method 1200 may be performed by a communications manager as described with reference to FIGS. 7 through 11. In some examples, a UE or base station may execute a set of instructions to control the functional elements of the UE or base station to perform the functions described herein. Additionally or alternatively, a UE or base station may perform aspects of the functions described herein using special-purpose hardware.

At 1205, the UE or base station may identify a transmission configuration for an SC waveform, the transmission configuration indicating a set of RBs allocated for communications with a receiving device. The operations of 1205 may be performed according to the methods described herein. In some examples, aspects of the operations of 1205 may be performed by an SC transmission configuration component as described with reference to FIGS. 7 through 11.

At 1210, the UE or base station may allocate a set of REs of the set of RBs for the SC waveform based on the transmission configuration, where a number of the set of REs is less than a total number of REs of the set of RBs. The operations of 1210 may be performed according to the methods described herein. In some examples, aspects of the operations of 1210 may be performed by an RE configuration component as described with reference to FIGS. 7 through 11.

At 1215, the UE or base station may transmit the SC waveform to the receiving device via the set of REs. The operations of 1215 may be performed according to the methods described herein. In some examples, aspects of the operations of 1215 may be performed by an SC transmission component as described with reference to FIGS. 7 through 11.

Figure 13:
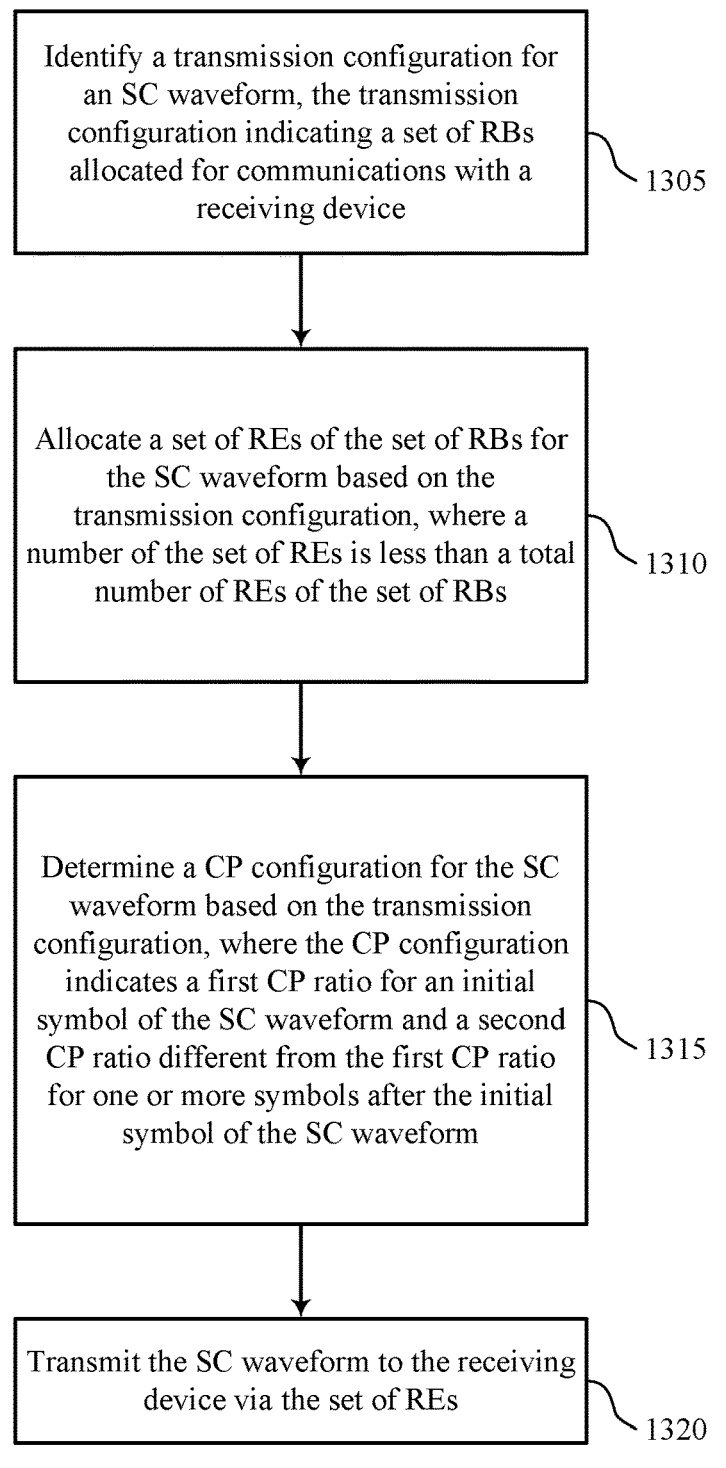

FIG. 13 shows a flowchart illustrating a method 1300 that supports flexible SC waveforms in accordance with aspects of the present disclosure. The operations of method 1300 may be implemented by a UE 115 or base station 105 or its components as described herein. For example, the operations of method 1300 may be performed by a communications manager as described with reference to FIGS. 7 through 11. In some examples, a UE or base station may execute a set of instructions to control the functional elements of the UE or base station to perform the functions described herein. Additionally or alternatively, a UE or base station may perform aspects of the functions described herein using special-purpose hardware.

At 1305, the UE or base station may identify a transmission configuration for an SC waveform, the transmission configuration indicating a set of RBs allocated for communications with a receiving device. The operations of 1305 may be performed according to the methods described herein. In some examples, aspects of the operations of 1305 may be performed by an SC transmission configuration component as described with reference to FIGS. 7 through 11.

At 1310, the UE or base station may allocate a set of REs of the set of RBs for the SC waveform based on the transmission configuration, where a number of the set of REs is less than a total number of REs of the set of RBs. The operations of 1310 may be performed according to the methods described herein. In some examples, aspects of the operations of 1310 may be performed by an RE configuration component as described with reference to FIGS. 7 through 11.

At 1315, the UE or base station may determine a CP configuration for the SC waveform based on the transmission configuration, where the CP configuration indicates a first CP ratio for an initial symbol of the SC waveform and a second CP ratio different from the first CP ratio for one or more symbols after the initial symbol of the SC waveform. The operations of 1315 may be performed according to the methods described herein. In some examples, aspects of the operations of 1315 may be performed by a CP determination component as described with reference to FIGS. 7 through 11.

At 1320, the UE or base station may transmit the SC waveform to the receiving device via the set of REs. The operations of 1320 may be performed according to the methods described herein. In some examples, aspects of the operations of 1320 may be performed by an SC transmission component as described with reference to FIGS. 7 through 11.

Figure 14:
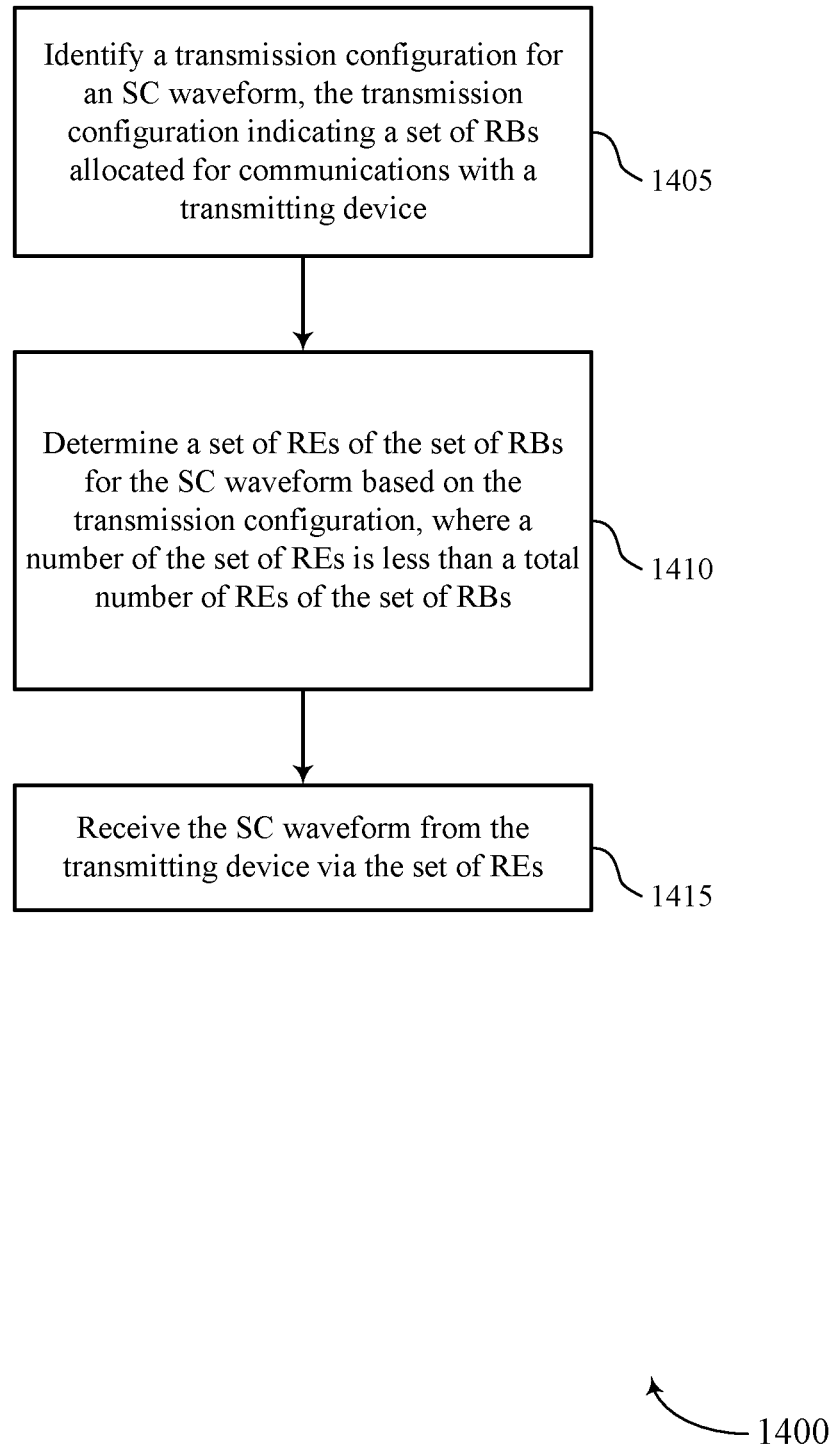

FIG. 14 shows a flowchart illustrating a method 1400 that supports flexible SC waveforms in accordance with aspects of the present disclosure. The operations of method 1400 may be implemented by a UE 115 or base station 105 or its components as described herein. For example, the operations of method 1400 may be performed by a communications manager as described with reference to FIGS. 7 through 11. In some examples, a UE or base station may execute a set of instructions to control the functional elements of the UE or base station to perform the functions described herein. Additionally or alternatively, a UE or base station may perform aspects of the functions described herein using special-purpose hardware.

At 1405, the UE or base station may identify a transmission configuration for an SC waveform, the transmission configuration indicating a set of RBs allocated for communications with a transmitting device. The operations of 1405 may be performed according to the methods described herein. In some examples, aspects of the operations of 1405 may be performed by an SC transmission configuration component as described with reference to FIGS. 7 through 11.

At 1410, the UE or base station may determine a set of REs of the set of RBs for the SC waveform based on the transmission configuration, where a number of the set of REs is less than a total number of REs of the set of RBs. The operations of 1410 may be performed according to the methods described herein. In some examples, aspects of the operations of 1410 may be performed by an RE configuration component as described with reference to FIGS. 7 through 11.

At 1415, the UE or base station may receive the SC waveform from the transmitting device via the set of REs. The operations of 1415 may be performed according to the methods described herein. In some examples, aspects of the operations of 1415 may be performed by an SC reception component as described with reference to FIGS. 7 through 11.

Figure 15:
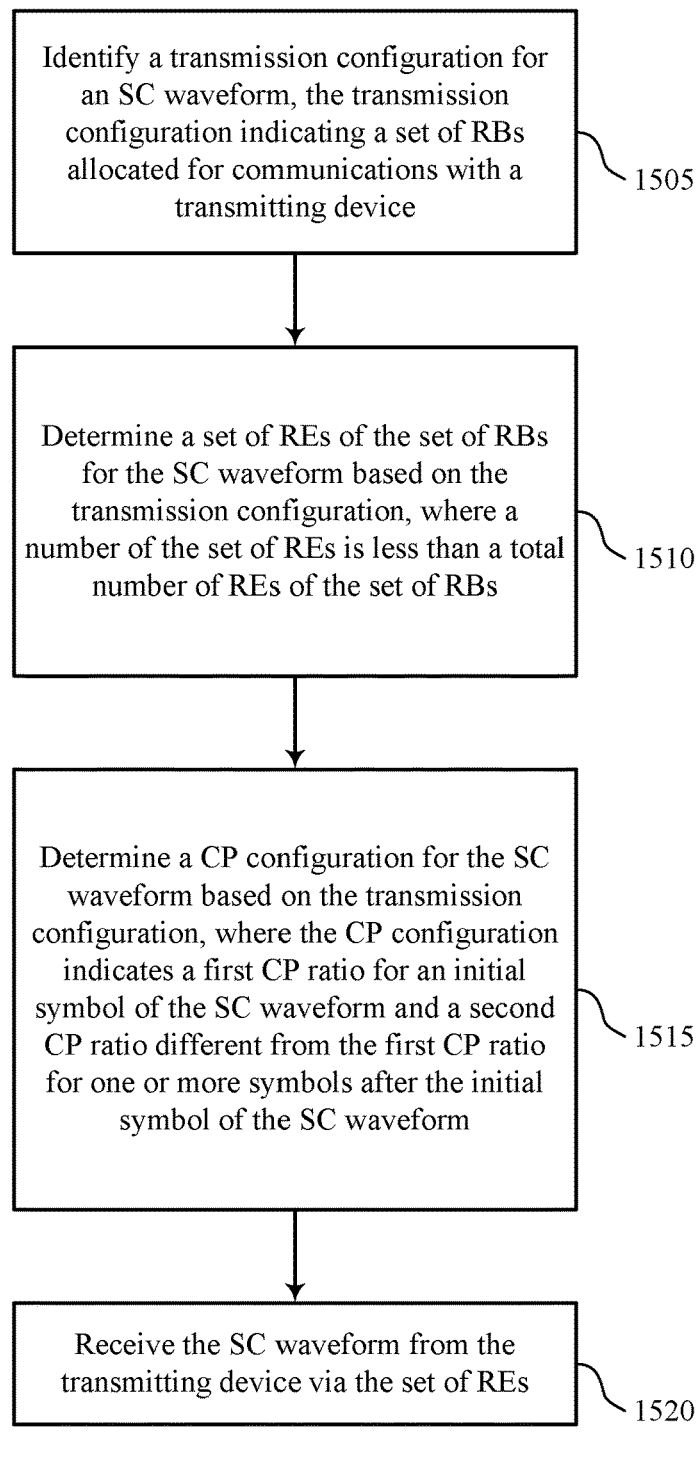

FIG. 15 shows a flowchart illustrating a method 1500 that supports flexible SC waveforms in accordance with aspects of the present disclosure. The operations of method 1500 may be implemented by a UE 115 or base station 105 or its components as described herein. For example, the operations of method 1500 may be performed by a communications manager as described with reference to FIGS. 7 through 11. In some examples, a UE or base station may execute a set of instructions to control the functional elements of the UE or base station to perform the functions described herein. Additionally or alternatively, a UE or base station may perform aspects of the functions described herein using special-purpose hardware.

At 1505, the UE or base station may identify a transmission configuration for an SC waveform, the transmission configuration indicating a set of RBs allocated for communications with a transmitting device. The operations of 1505 may be performed according to the methods described herein. In some examples, aspects of the operations of 1505 may be performed by an SC transmission configuration component as described with reference to FIGS. 7 through 11.

At 1510, the UE or base station may determine a set of REs of the set of RBs for the SC waveform based on the transmission configuration, where a number of the set of REs is less than a total number of REs of the set of RBs. The operations of 1510 may be performed according to the methods described herein. In some examples, aspects of the operations of 1510 may be performed by an RE configuration component as described with reference to FIGS. 7 through 11.

At 1515, the UE or base station may determine a CP configuration for the SC waveform based on the transmission configuration, where the CP configuration indicates a first CP ratio for an initial symbol of the SC waveform and a second CP ratio different from the first CP ratio for one or more symbols after the initial symbol of the SC waveform. The operations of 1515 may be performed according to the methods described herein. In some examples, aspects of the operations of 1515 may be performed by a CP determination component as described with reference to FIGS. 7 through 11.

At 1520, the UE or base station may receive the SC waveform from the transmitting device via the set of REs. The operations of 1520 may be performed according to the methods described herein. In some examples, aspects of the operations of 1520 may be performed by an SC reception component as described with reference to FIGS. 7 through 11.

Figure 16:
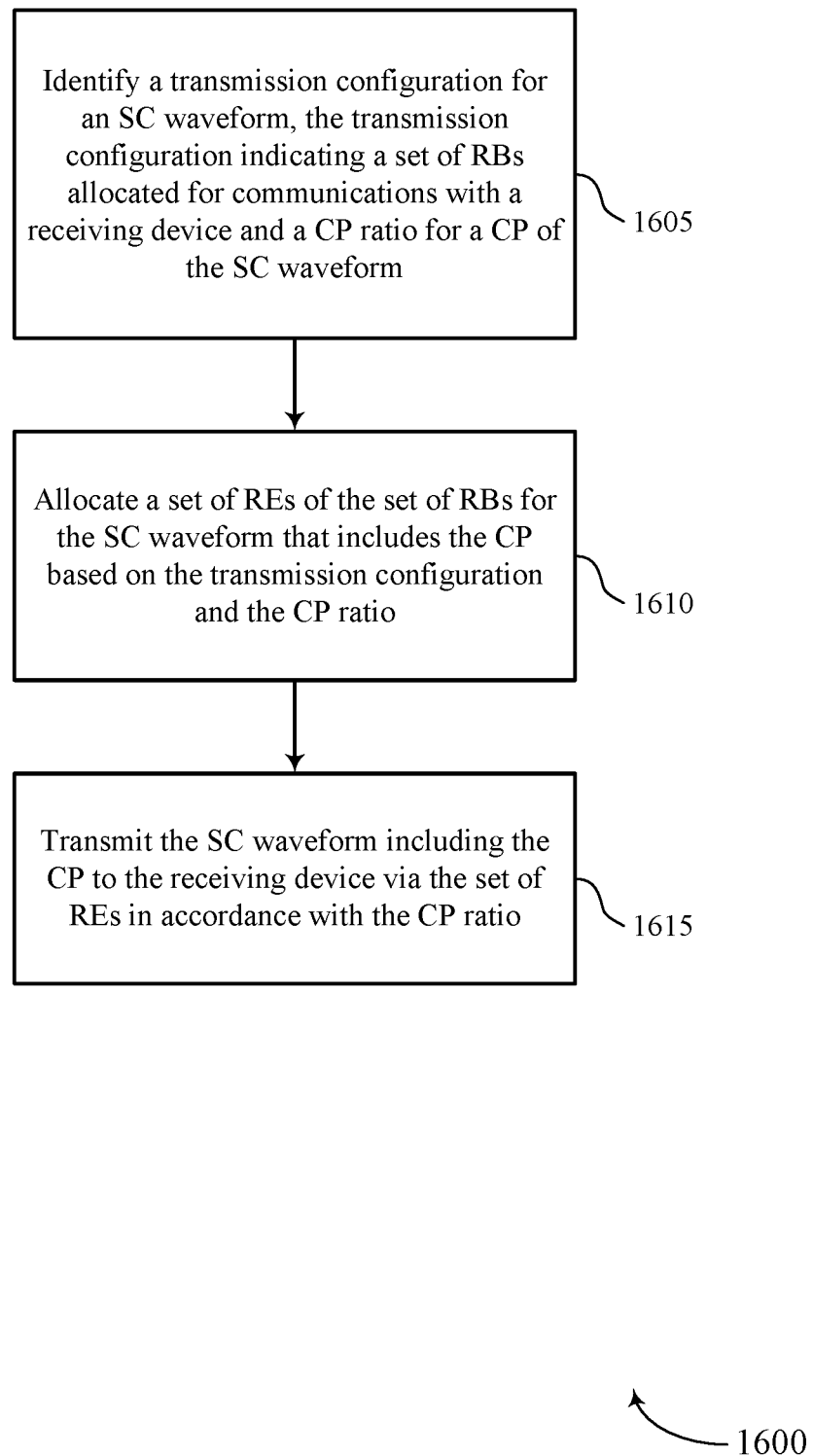

FIG. 16 shows a flowchart illustrating a method 1600 that supports flexible SC waveforms in accordance with aspects of the present disclosure. The operations of method 1600 may be implemented by a UE 115 or base station 105 or its components as described herein. For example, the operations of method 1600 may be performed by a communications manager as described with reference to FIGS. 7 through 11. In some examples, a UE or base station may execute a set of instructions to control the functional elements of the UE or base station to perform the functions described herein. Additionally or alternatively, a UE or base station may perform aspects of the functions described herein using special-purpose hardware.

At 1605, the UE or base station may identify a transmission configuration for an SC waveform, the transmission configuration indicating a set of RBs allocated for communications with a receiving device and a CP ratio for a CP of the SC waveform. The operations of 1605 may be performed according to the methods described herein. In some examples, aspects of the operations of 1605 may be performed by an SC transmission configuration component as described with reference to FIGS. 7 through 11.

At 1610, the UE or base station may allocate a set of REs of the set of RBs for the SC waveform that includes the CP based on the transmission configuration and the CP ratio. The operations of 1610 may be performed according to the methods described herein. In some examples, aspects of the operations of 1610 may be performed by an RE configuration component as described with reference to FIGS. 7 through 11.

At 1615, the UE or base station may transmit the SC waveform including the CP to the receiving device via the set of REs in accordance with the CP ratio. The operations of 1615 may be performed according to the methods described herein. In some examples, aspects of the operations of 1615 may be performed by an SC transmission component as described with reference to FIGS. 7 through 11.

Figure 17:
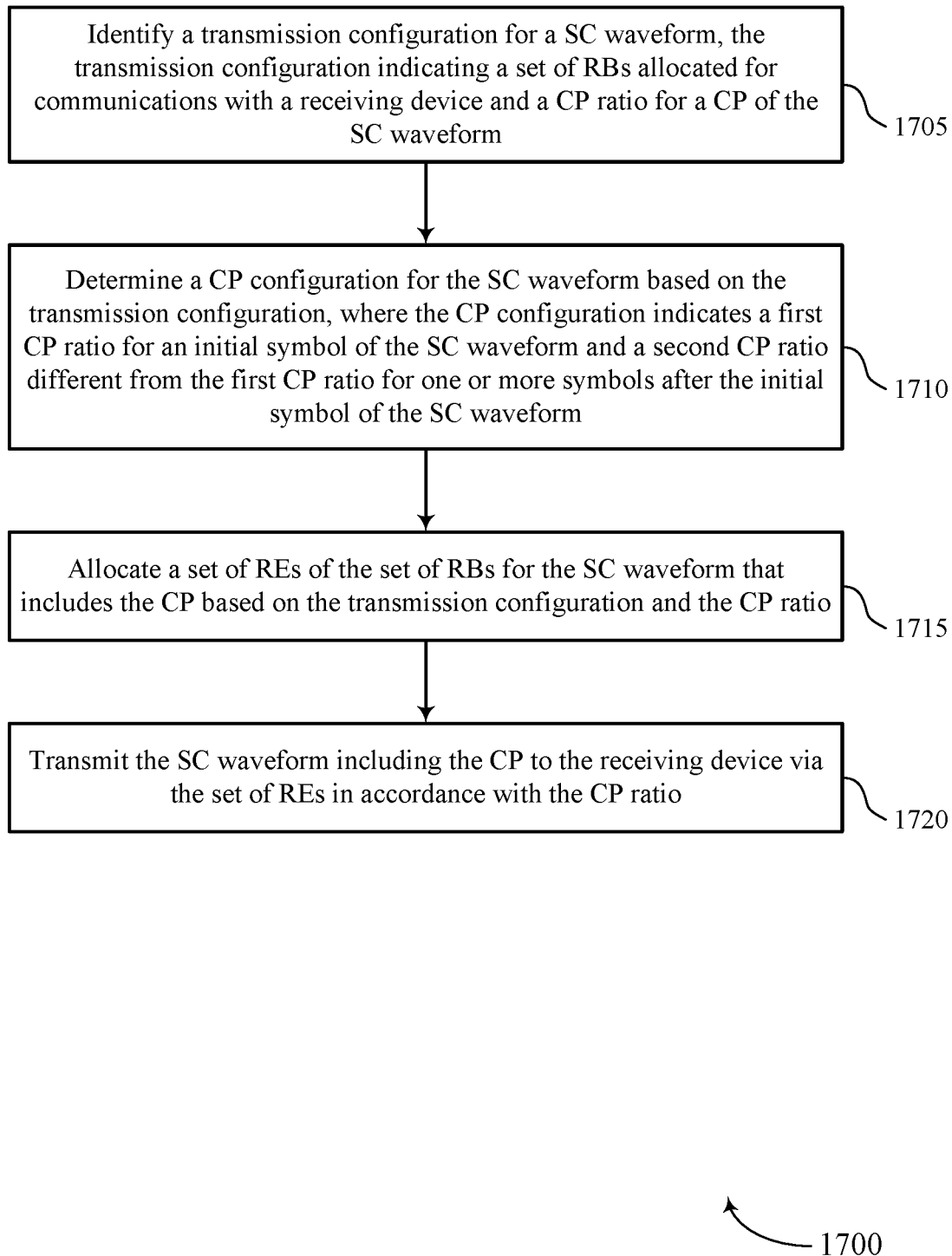

FIG. 17 shows a flowchart illustrating a method 1700 that supports flexible SC waveforms in accordance with aspects of the present disclosure. The operations of method 1700 may be implemented by a UE 115 or base station 105 or its components as described herein. For example, the operations of method 1700 may be performed by a communications manager as described with reference to FIGS. 7 through 11. In some examples, a UE or base station may execute a set of instructions to control the functional elements of the UE or base station to perform the functions described herein. Additionally or alternatively, a UE or base station may perform aspects of the functions described herein using special-purpose hardware.

At 1705, the UE or base station may identify a transmission configuration for an SC waveform, the transmission configuration indicating a set of RBs allocated for communications with a receiving device and a CP ratio for a CP of the SC waveform. The operations of 1705 may be performed according to the methods described herein. In some examples, aspects of the operations of 1705 may be performed by an SC transmission configuration component as described with reference to FIGS. 7 through 11.

At 1710, the UE or base station may allocate a set of REs of the set of RBs for the SC waveform that includes the CP based on the transmission configuration and the CP ratio. The operations of 1710 may be performed according to the methods described herein. In some examples, aspects of the operations of 1710 may be performed by an RE configuration component as described with reference to FIGS. 7 through 11.

At 1715, the UE or base station may determine a CP configuration for the SC waveform based on the transmission configuration, where the CP configuration indicates a first CP ratio for an initial symbol of the SC waveform and a second CP ratio different from the first CP ratio for one or more symbols after the initial symbol of the SC waveform. The operations of 1715 may be performed according to the methods described herein. In some examples, aspects of the operations of 1715 may be performed by a CP determination component as described with reference to FIGS. 7 through 11.

At 1720, the UE or base station may transmit the SC waveform including the CP to the receiving device via the set of REs in accordance with the CP ratio. The operations of 1720 may be performed according to the methods described herein. In some examples, aspects of the operations of 1720 may be performed by an SC transmission component as described with reference to FIGS. 7 through 11.

Figure 18:
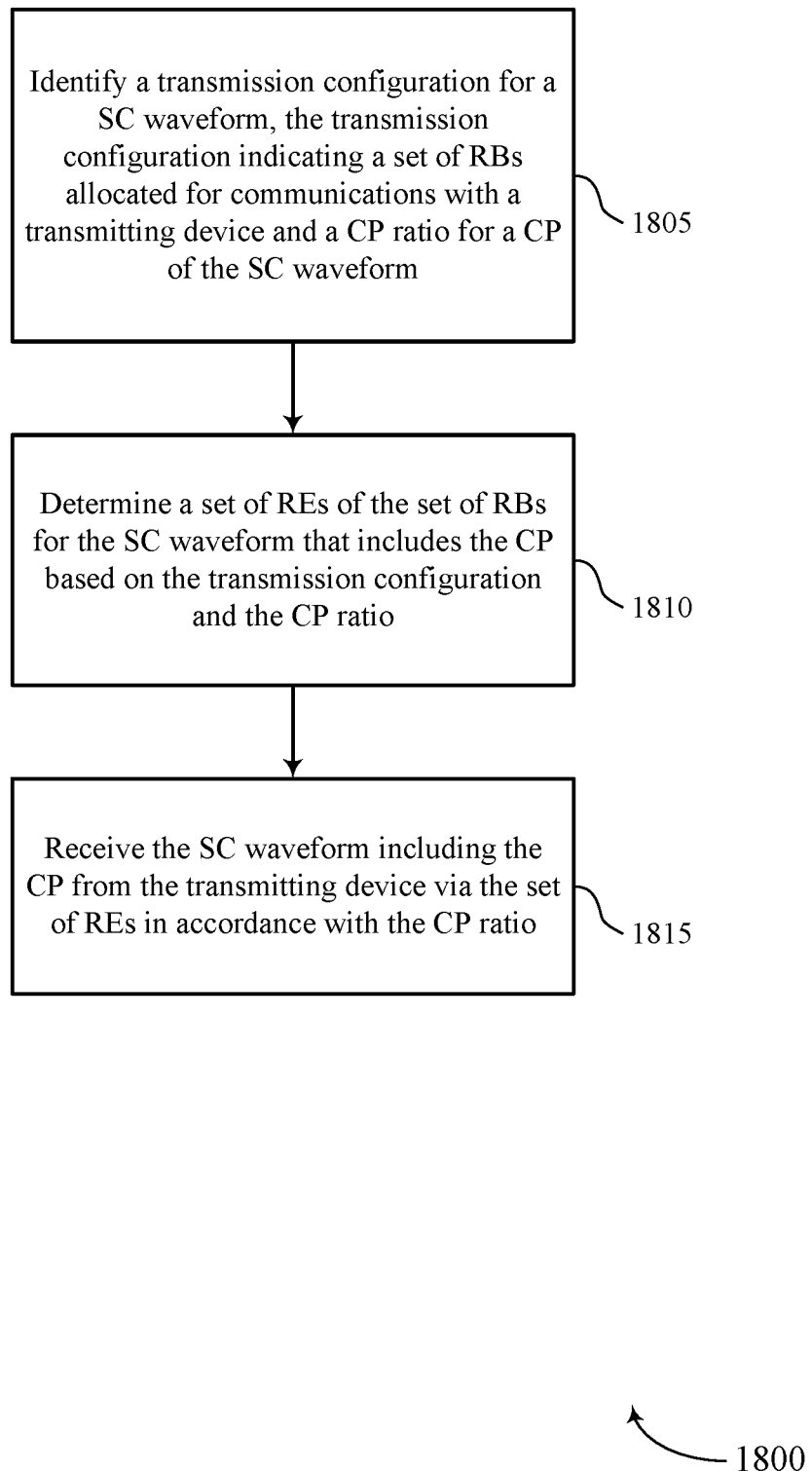

FIG. 18 shows a flowchart illustrating a method 1800 that supports flexible SC waveforms in accordance with aspects of the present disclosure. The operations of method 1800 may be implemented by a UE 115 or base station 105 or its components as described herein. For example, the operations of method 1800 may be performed by a communications manager as described with reference to FIGS. 7 through 11. In some examples, a UE or base station may execute a set of instructions to control the functional elements of the UE or base station to perform the functions described herein. Additionally or alternatively, a UE or base station may perform aspects of the functions described herein using special-purpose hardware.

At 1805, the UE or base station may identify a transmission configuration for an SC waveform, the transmission configuration indicating a set of RBs allocated for communications with a transmitting device and a CP ratio for a CP of the SC waveform. The operations of 1805 may be performed according to the methods described herein. In some examples, aspects of the operations of 1805 may be performed by an SC transmission configuration component as described with reference to FIGS. 7 through 11.

At 1810, the UE or base station may determine a set of REs of the set of RBs for the SC waveform that includes the CP based on the transmission configuration and the CP ratio. The operations of 1810 may be performed according to the methods described herein. In some examples, aspects of the operations of 1810 may be performed by an RE configuration component as described with reference to FIGS. 7 through 11.

At 1815, the UE or base station may receive the SC waveform including the CP from the transmitting device via the set of REs in accordance with the CP ratio. The operations of 1815 may be performed according to the methods described herein. In some examples, aspects of the operations of 1815 may be performed by an SC reception component as described with reference to FIGS. 7 through 11.

Figure 19:
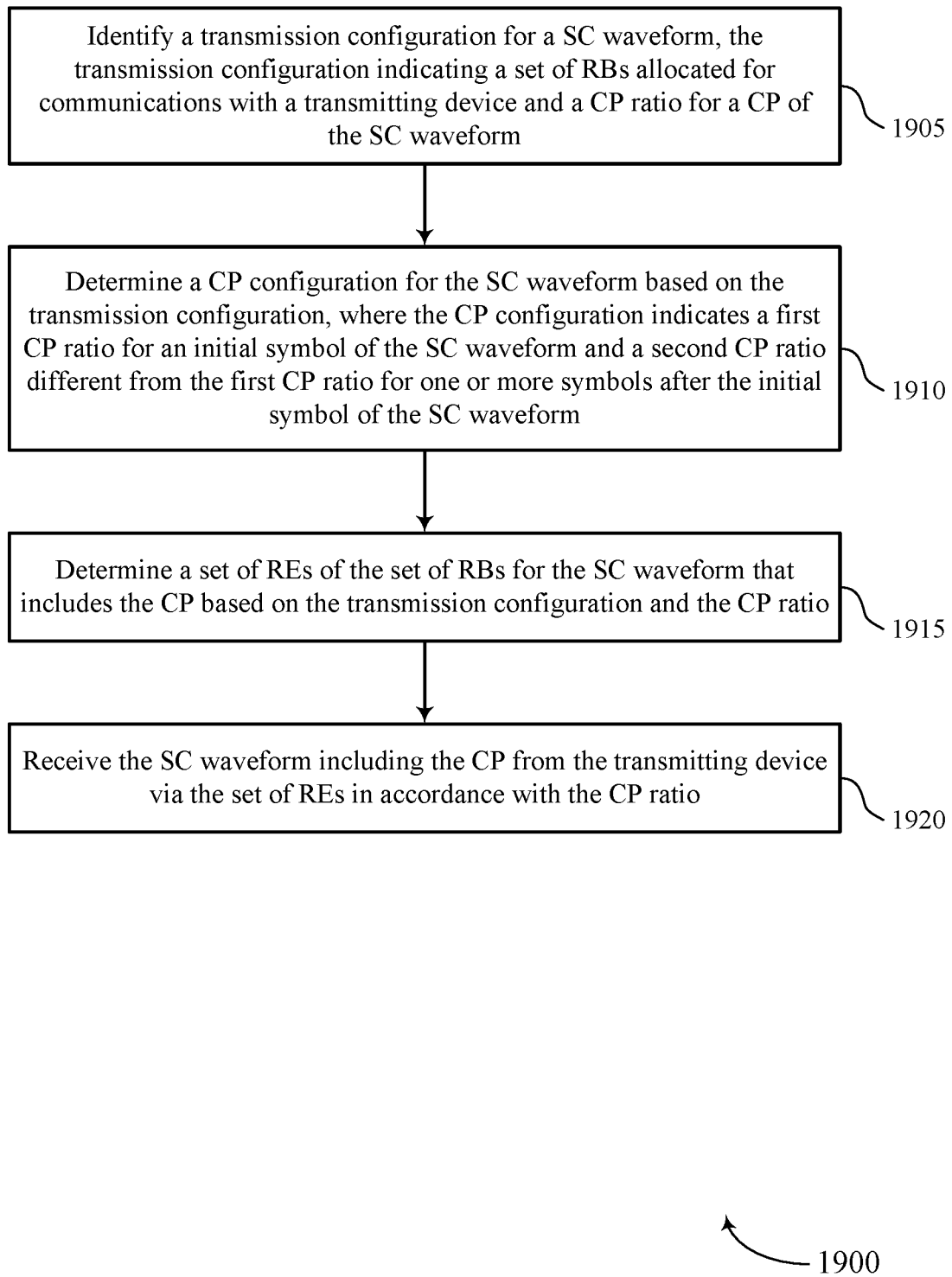

FIG. 19 shows a flowchart illustrating a method 1900 that supports flexible SC waveforms in accordance with aspects of the present disclosure. The operations of method 1900 may be implemented by a UE 115 or base station 105 or its components as described herein. For example, the operations of method 1900 may be performed by a communications manager as described with reference to FIGS. 7 through 11. In some examples, a UE or base station may execute a set of instructions to control the functional elements of the UE or base station to perform the functions described herein. Additionally or alternatively, a UE or base station may perform aspects of the functions described herein using special-purpose hardware.

At 1905, the UE or base station may identify a transmission configuration for an SC waveform, the transmission configuration indicating a set of RBs allocated for communications with a transmitting device and a CP ratio for a CP of the SC waveform. The operations of 1905 may be performed according to the methods described herein. In some examples, aspects of the operations of 1905 may be performed by an SC transmission configuration component as described with reference to FIGS. 7 through 11.

At 1910, the UE or base station may determine a set of REs of the set of RBs for the SC waveform that includes the CP based on the transmission configuration and the CP ratio. The operations of 1910 may be performed according to the methods described herein. In some examples, aspects of the operations of 1910 may be performed by an RE configuration component as described with reference to FIGS. 7 through 11.

At 1915, the UE or base station may determine a CP configuration for the SC waveform based on the transmission configuration, where the CP configuration indicates a first CP ratio for an initial symbol of the SC waveform and a second CP ratio different from the first CP ratio for one or more symbols after the initial symbol of the SC waveform. The operations of 1915 may be performed according to the methods described herein. In some examples, aspects of the operations of 1915 may be performed by a CP determination component as described with reference to FIGS. 7 through 11.

At 1920, the UE or base station may receive the SC waveform including the CP from the transmitting device via the set of REs in accordance with the CP ratio. The operations of 1920 may be performed according to the methods described herein. In some examples, aspects of the operations of 1920 may be performed by an SC reception component as described with reference to FIGS. 7 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), SC frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a transmitting device, comprising:

identifying a transmission configuration for a single carrier waveform, the transmission configuration indicating a set of resource blocks allocated for communications with a receiving device;

allocating a set of resource elements of the set of resource blocks for the single carrier waveform based at least in part on the transmission configuration, wherein a number of the set of resource elements is less than a total number of resource elements of the set of resource blocks;

transmitting an indication of the transmission configuration to the receiving device via radio resource control (RRC) signaling or downlink control information (DCI); and transmitting the single carrier waveform to the receiving device via the set of resource elements.

2. The method of claim 1, further comprising:

identifying a mapping configuration for mapping data associated with the single carrier waveform to the set of resource elements based at least in part on the transmission configuration; and mapping the data associated with the single carrier waveform to the set of resource elements according to the mapping configuration.

3. The method of claim 2, wherein mapping the data comprises:

mapping data beginning at a first resource element, a middle resource element, or a last resource element of the set of resource elements based at least in part on the mapping configuration and respective locations of each resource element of the set of resource elements, wherein the data is mapped such that at least one resource element of the set of resource elements is unoccupied.

4. The method of claim 2, further comprising:

receiving an indication of the mapping configuration in a message from the receiving device, the message comprising the transmission configuration.

5. The method of claim 1, further comprising:

receiving a message from the receiving device, the message indicating the transmission configuration for the single carrier waveform based at least in part on a resource element identifier (REID) included in the message, wherein the REID is based at least in part on a cell identifier (ID) of a cell for communications between the transmitting device and the receiving device.

6. The method of claim 1, further comprising:

determining a demodulation reference signal (DMRS) pattern, a DMRS length, or a transport block size (TBS) associated with the single carrier waveform based at least in part on the set of resource elements or the number of the set of resource elements.

7. A method for wireless communications at a receiving device, comprising:

identifying a transmission configuration for a single carrier waveform, the transmission configuration indicating a set of resource blocks allocated for communications with a transmitting device;

determining a set of resource elements of the set of resource blocks for the single carrier waveform based at least in part on the transmission configuration, wherein a number of the set of resource elements is less than a total number of resource elements of the set of resource blocks;

receiving an indication of the transmission configuration from the transmitting device via radio resource control (RRC) signaling or downlink control information (DCI); and receiving the single carrier waveform from the transmitting device via the set of resource elements.

8. The method of claim 7, further comprising:

identifying a mapping configuration for data of the single carrier waveform mapped to the set of resource elements based at least in part on the transmission configuration; and demapping the data of the single carrier waveform.

9. The method of claim 8, further comprising:

demapping the data beginning at a first resource element, a middle resource element, or a last resource element of the set of resource elements based at least in part on the mapping configuration and respective locations of each resource element of the set of resource elements, wherein the data is mapped such that at least one resource element of the set of resource elements is unoccupied.

10. The method of claim 8, further comprising:

receiving an indication of the mapping configuration in a message from the transmitting device, the message comprising the transmission configuration.

11. The method of claim 7, further comprising:

transmitting a message to the transmitting device, the message indicating the transmission configuration for the single carrier waveform based at least in part on a resource element identifier (REID) included in the message, wherein the REID is based at least in part on a cell identifier (ID) of a cell for communications between the transmitting device and the receiving device.

12. The method of claim 7, further comprising:

determining a demodulation reference signal (DMRS) pattern, a DMRS length, or a transport block size (TBS) associated with the single carrier waveform based at least in part on the set of resource elements or the number of the set of resource elements.

13. A method for wireless communications at a transmitting device, comprising:

identifying a transmission configuration for a single carrier waveform, the transmission configuration indicating a set of resource blocks allocated for communications with a receiving device and a cyclic prefix ratio for a cyclic prefix of the single carrier waveform;

allocating a set of resource elements of the set of resource blocks for the single carrier waveform that includes the cyclic prefix based at least in part on the transmission configuration and the cyclic prefix ratio; and transmitting the single carrier waveform including the cyclic prefix to the receiving device via the set of resource elements in accordance with the cyclic prefix ratio.

14. The method of claim 13, further comprising:

determining a cyclic prefix (CP) configuration for the single carrier waveform based at least in part on the transmission configuration, wherein the CP configuration indicates a first CP ratio for an initial symbol of the single carrier waveform and a second CP ratio different from the first CP ratio for one or more symbols after the initial symbol of the single carrier waveform.

15. The method of claim 14, further comprising:

determining the first CP ratio and the second CP ratio based at least in part on a subcarrier spacing associated with the single carrier waveform;

generating a first CP for the initial symbol based at least in part on the first CP ratio; and generating at least one additional CP for the one or more symbols after the initial symbol based at least in part on the second CP ratio, wherein the second CP ratio is less than the first CP ratio.

16. The method of claim 15, further comprising:

transmitting the single carrier waveform including the first CP and the at least one additional CP to the receiving device.

17. The method of claim 15, wherein a number of samples for the first CP and a number of samples for the at least one additional CP are based at least in part on the subcarrier spacing.

18. The method of claim 14, further comprising:

determining the first CP ratio and the second CP ratio based at least in part on a bandwidth part associated with the single carrier waveform;

generating a first CP for the initial symbol based at least in part on the first CP ratio; and generating at least one additional CP for the one or more symbols after the initial symbol based at least in part on the second CP ratio, wherein the second CP ratio is less than the first CP ratio.

19. The method of claim 18, wherein a number of samples for the first CP and a number of samples for the at least one additional CP are based at least in part on a number of the set of resource blocks of the bandwidth part.

20. The method of claim 18, further comprising:

transmitting the single carrier waveform including the first CP and the at least one additional CP to the receiving device.

21. A method for wireless communications at a receiving device, comprising:

identifying a transmission configuration for a single carrier waveform, the transmission configuration indicating a set of resource blocks allocated for communications with a transmitting device and a cyclic prefix ratio for a cyclic prefix of the single carrier waveform;

determining a set of resource elements of the set of resource blocks for the single carrier waveform that includes the cyclic prefix based at least in part on the transmission configuration and the cyclic prefix ratio; and receiving the single carrier waveform including the cyclic prefix from the transmitting device via the set of resource elements in accordance with the cyclic prefix ratio.

22. The method of claim 21, further comprising:

determining a cyclic prefix (CP) configuration for the single carrier waveform based at least in part on the transmission configuration, wherein the CP configuration indicates a first CP ratio for an initial symbol of the single carrier waveform and a second CP ratio different from the first CP ratio for one or more symbols after the initial symbol of the single carrier waveform.

23. The method of claim 22, further comprising:

determining the first CP ratio and the second CP ratio based at least in part on a subcarrier spacing associated with the single carrier waveform;

identifying a first CP for the initial symbol based at least in part on the first CP ratio; and identifying at least one additional CP for the one or more symbols after the initial symbol based at least in part on the second CP ratio, wherein the second CP ratio is less than the first CP ratio.

24. The method of claim 23, further comprising:
receiving the single carrier waveform including the first CP and the at least one additional CP from the transmitting device.

25. The method of claim 23, wherein a number of samples for the first CP and a number of samples for the at least one additional CP are based at least in part on the subcarrier spacing.

26. The method of claim 22, further comprising:
determining the first CP ratio and the second CP ratio based at least in part on a bandwidth part associated with the single carrier waveform;
identifying a first CP for the initial symbol based at least in part on the first CP ratio; and
identifying at least one additional CP for the one or more symbols after the initial symbol based at least in part on the second CP ratio, wherein the second CP ratio is less than the first CP ratio.

27. The method of claim 26, wherein a number of samples for the first CP and a number of samples for the at least one additional CP are based at least in part on a number of the set of resource blocks of the bandwidth part.

28. The method of claim 26, further comprising:
receiving the single carrier waveform including the first CP and the at least one additional CP from the transmitting device.

\* \* \* \* \*